United States Patent
Fedorowicz et al.

(10) Patent No.: US 6,478,018 B2
(45) Date of Patent: *Nov. 12, 2002

(54) MULTI-PERIPHERAL PERIMETER SEALED FLAT PANEL COALESCING FILTER ELEMENT

(75) Inventors: Jeffrey A. Fedorowicz, Madison, WI (US); Christopher E. Holm, Madison, WI (US); G. Michael Gron, Jr., Columbus, IN (US); Mark V. Holzmann, Stoughton, WI (US); Kendall M. McBroom, Stoughton, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/882,226

(22) Filed: Jun. 15, 2001

(65) Prior Publication Data

US 2002/0100464 A1 Aug. 1, 2002

Related U.S. Application Data

(63) Continuation-in-part of application No. 09/387,819, filed on Sep. 1, 1999, now Pat. No. 6,247,463.

(51) Int. Cl.[7] .............................................. F02M 25/06
(52) U.S. Cl. ...................................................... 123/572
(58) Field of Search ................................. 123/572, 573, 123/574, 41.86

(56) References Cited

U.S. PATENT DOCUMENTS

| | | | |
|---|---|---|---|
| 3,765,386 A | 10/1973 | Ottofy | |
| 4,062,595 A | 12/1977 | Roepke et al. | |
| 4,396,407 A | * 8/1983 | Reese | 123/572 |
| 4,453,525 A | 6/1984 | Debruler | |
| 4,569,323 A | 2/1986 | Okumura | |
| 4,602,595 A | 7/1986 | Aoki et al. | |
| 4,627,406 A | 12/1986 | Namiki et al. | |
| 4,723,529 A | 2/1988 | Yokoi et al. | |
| 4,995,891 A | * 2/1991 | Jaynes | 123/573 |
| 5,072,713 A | * 12/1991 | Sweeten | 123/573 |
| 5,277,154 A | 1/1994 | McDowell | |
| 5,669,366 A | 9/1997 | Beach et al. | |
| 6,247,463 B1 | * 6/2001 | Fedorowicz et al. | 123/572 |

* cited by examiner

Primary Examiner—Marguerite McMahon
(74) Attorney, Agent, or Firm—Andrus, Sceales, Starke & Sawall, LLP

(57) ABSTRACT

A flat panel filter element is provided for a diesel engine crankcase ventilation filter having a flat low profile filter housing extending in a horizontal plane. The flat panel filter element has media, including coalescing media, spanning a horizontal supporting and sealing perimeter border frame and passing flow downwardly therethrough.

38 Claims, 21 Drawing Sheets

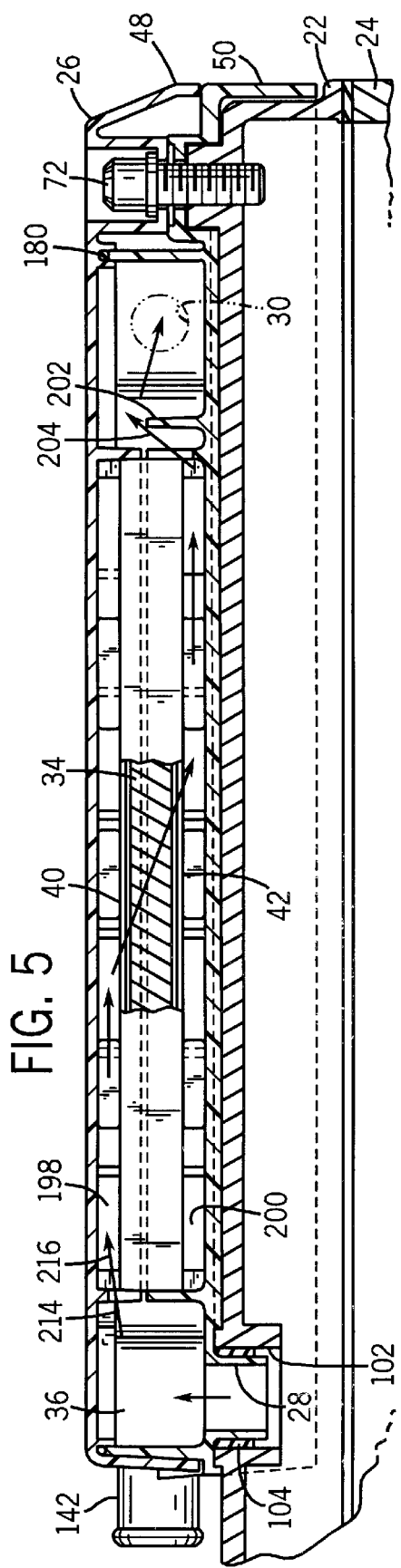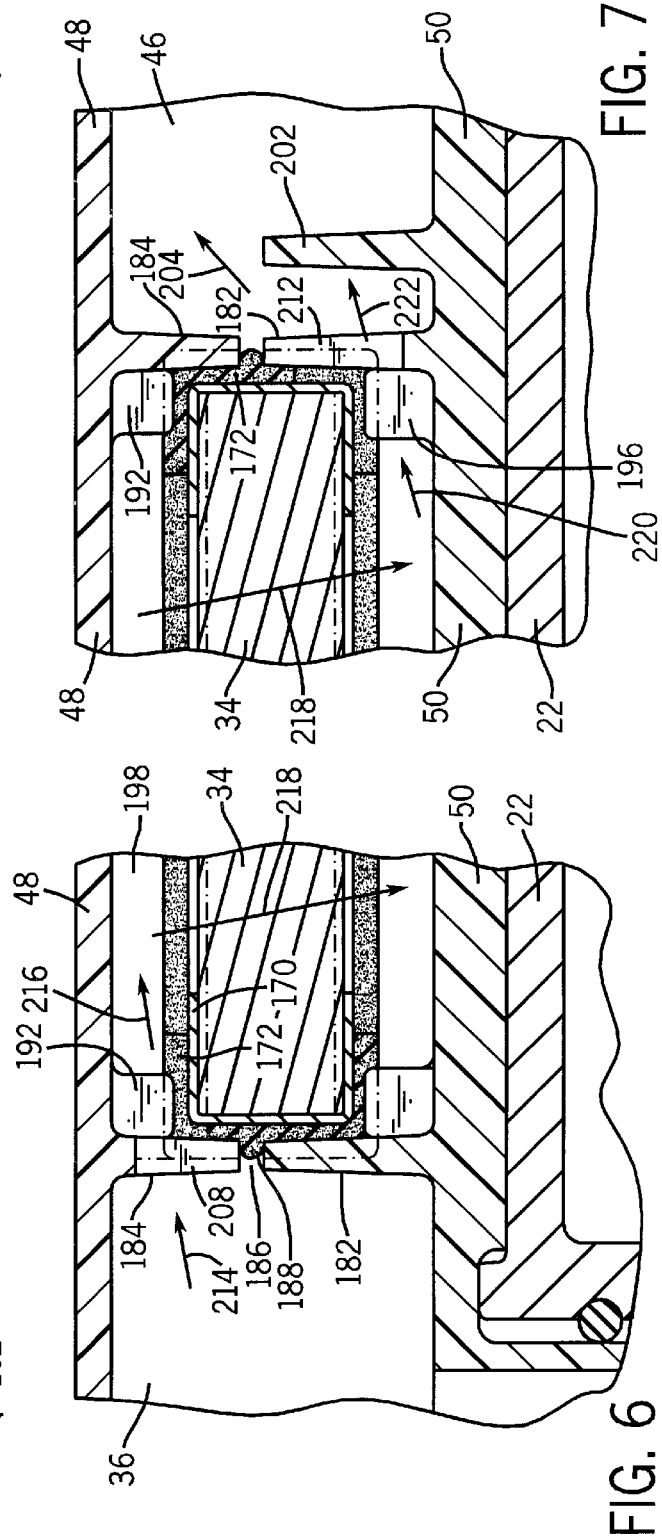

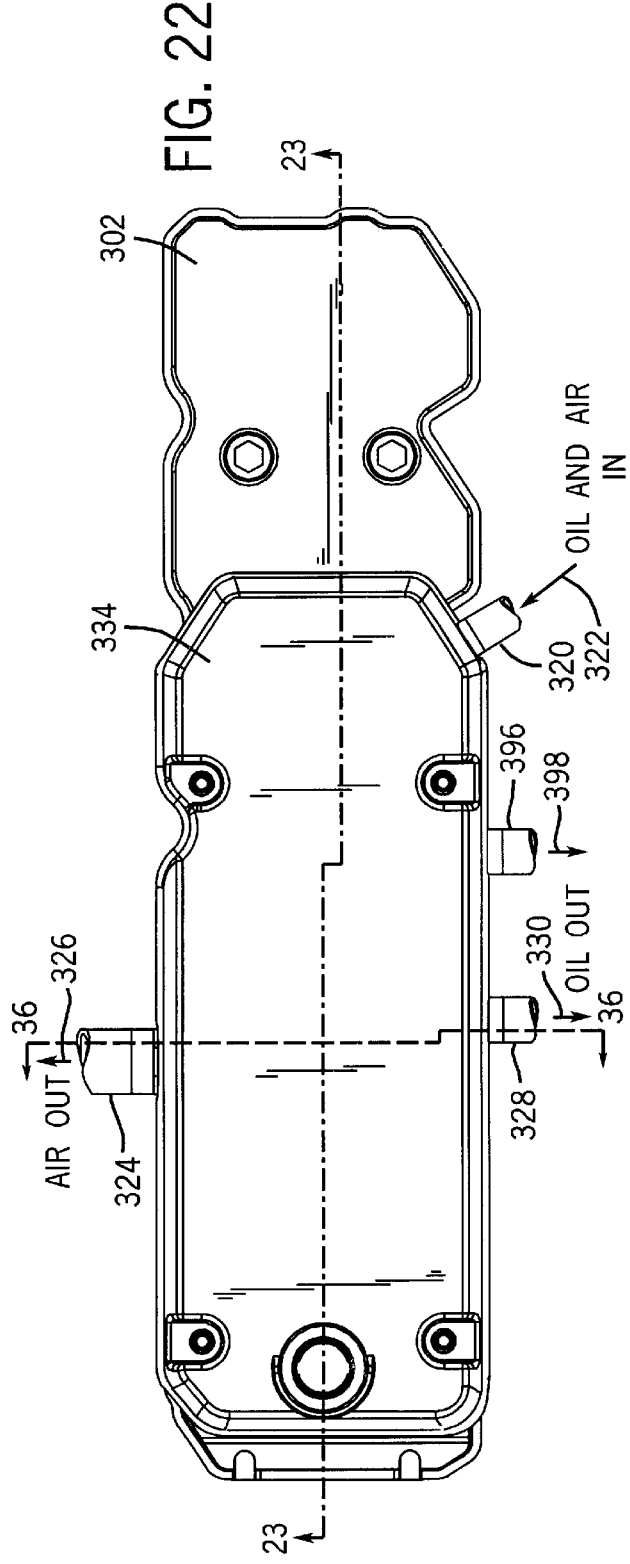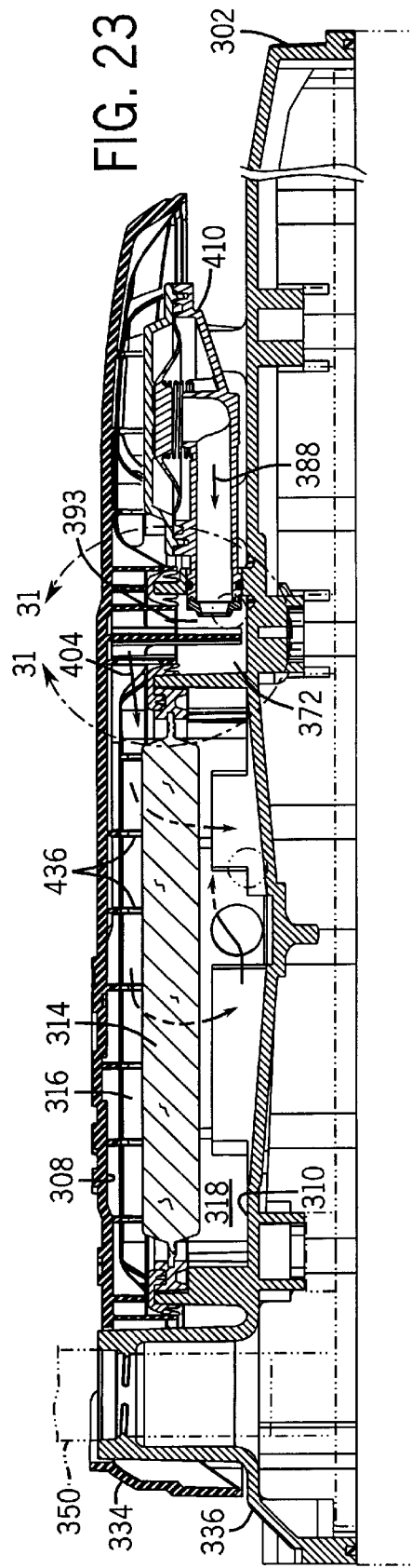

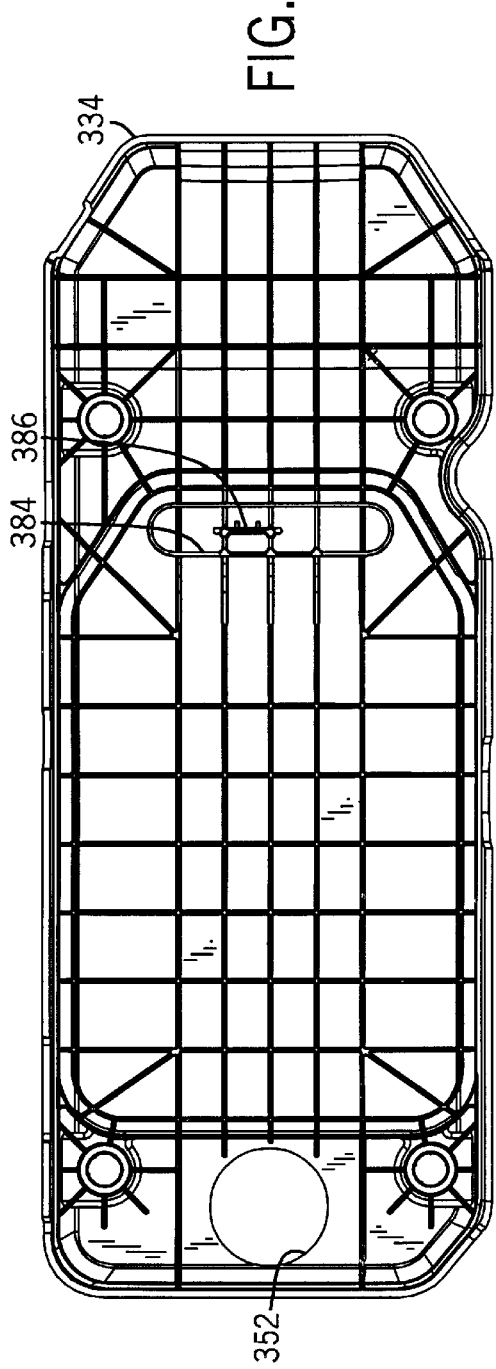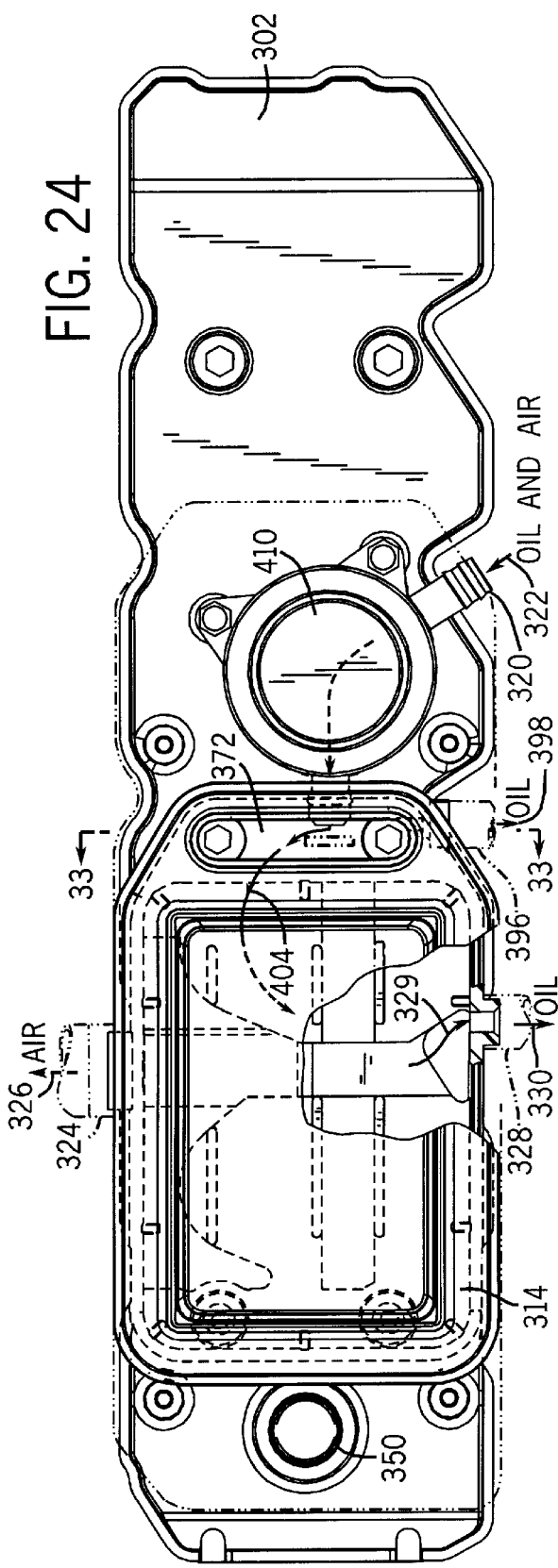

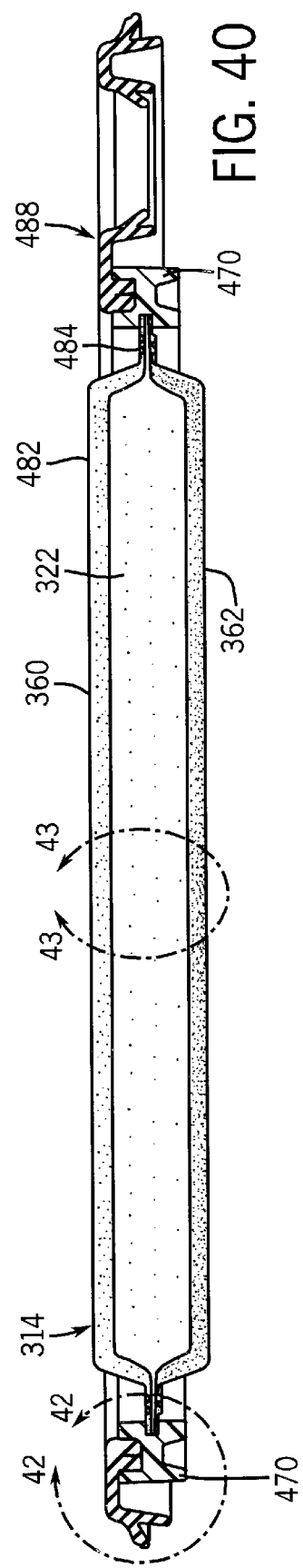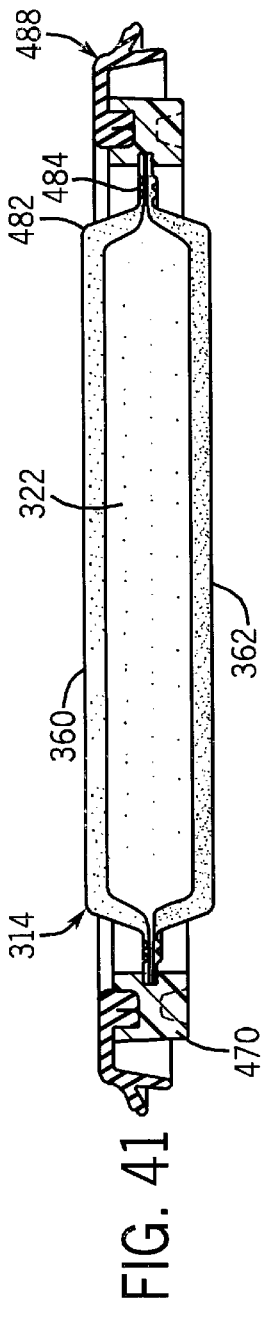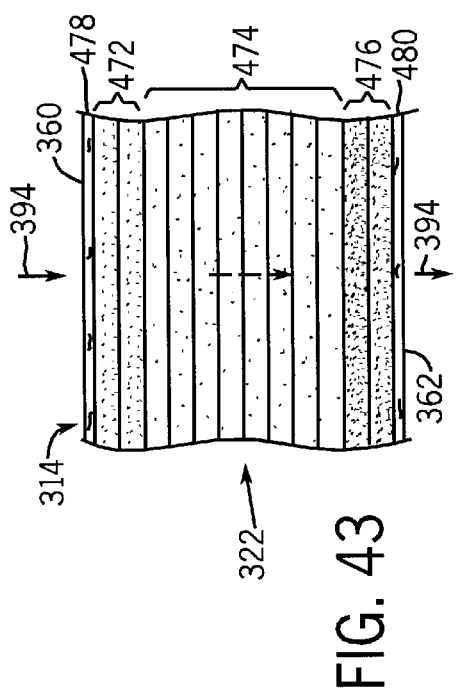

MULTI-PERIPHERAL PERIMETER SEALED FLAT PANEL COALESCING FILTER ELEMENT

CROSS-REFERENCE TO RELATED APPLICATIONS

This application is a continuation-in-part of U.S. application Ser. No. 09/387,819, filed Sep. 1, 1999 now U.S. Pat. No. 6,297,463. Reference is also made to commonly owned co-pending companion U.S. application Ser. No. 09/882,743, filed on even date herewith, which is also a continuation-in-part of the noted '819 application.

BACKGROUND AND SUMMARY OF THE INVENTION

Parent Invention

The parent invention of the noted '819 application relates to crankcase ventilation filters for diesel engines.

Diesel engines have crankcase vents to relieve pressure buildup in the engine. A frequent cause of pressure buildup in the engine is from air leaking past the piston rings into the crankcase. The air that is vented out of the crankcase, also known as blow-by gas or crankcase gas, contains soot and oil mist particles. For many years, the blow-by gas along with the oil and soot was vented to atmosphere through a "road tube" to direct the flow to a desired area such as the ground, or away from specific engine parts. In recent years, metal mesh filters have been used to try and remove some of the larger oil droplets from the blow-by stream. These have had mixed results in the field. There have also been after market products which remove oil mist and soot from engine blow-by gas. These products have been designed for industrial and stationary applications, and are usually too large and bulky for mobile applications.

Over the past few years, for appearance and environmental reasons, there has been motivation to eliminate the "road tube" type of design, and close the crankcase ventilation system. Closing the crankcase ventilation system means returning the blow-by gas back to the incoming combustion air stream to the engine, for example at the air cleaner or turbocharger. If a closed crankcase system is desired, aerosol sized droplets and mists, which for the most part are ignored in an open system, should be removed. This is desired in a closed system in order to avoid adverse effects on various engine components, especially the turbocharger and after cooler. To do this, a degree of filtration beyond metal mesh is desired.

Packaging a closed crankcase ventilation system in a diesel engine compartment is a problem because of limited space. A closed crankcase ventilation, CCV, system requires routing hoses from the crankcase vent on the engine to the CCV housing, and from the CCV housing to either the dirty side of the air filter or to the turbo inlet of the diesel engine. Furthermore, a drain line needs to be run from the CCV housing back to the oil sump. A "stand alone" CCV system will have certain envelope requirements. For example, in a mid-range diesel engine, e.g. 150 to 300 horsepower, a projected envelope size would be a cylindrical housing of about four inches outer diameter and six to seven inches long plus room for connecting hoses, drain lines and valves. In mobile diesel engine applications, finding this amount of space in a convenient location is a problem.

The parent invention provides a diesel engine crankcase ventilation filter addressing and solving the above noted packaging and space problem. The parent invention provides a flat low profile crankcase ventilation filter. In preferred form, the parent invention enables mounting of the flat low profile filter housing directly on the diesel engine valve cover, with minimum space requirements and minimum plumbing requirements.

Present Invention

The present invention relates to a flat panel filter element for a diesel engine crankcase ventilation filter having a flat low profile filter housing extending in a horizontal plane, and more particularly in one preferred form to the sealing mechanism used to seal the element between the valve cover on the engine and the plastic upper housing cover section that is the top of the closed crankcase ventilation system. A plastic frame is provided around a pillow of media with high loft through heat sealing the pillow. Specific media layering and media orientation is enabled. An integral gasket molded to the frame is enabled. A double lip gasket is further enabled. The element removes oil mists and other contaminants from the blow-by gas stream, allowing the effluent gases to be vented into the intake air stream or similar location for the diesel engine. The molded frame is injected molded directly onto the perimeter of the filter media.

In designing a closed crankcase ventilation, CCV, system special care needs to be given to the design of the filter element. The element needs to be efficient enough to protect the components downstream of the element in the system, and have a low enough differential pressure to avoid excessive crankcase pressure, and have sufficient field life, and fit a specific size envelope. Size constraints in a mobile engine compartment dictate a flat panel filter to maximize effect filtering area while staying in the envelope for the engine. The multiple layer media design allows the proper combination of life, efficiency and pressure drop to be used in a CCV system.

The present invention enables an element with three regions of media, each of one or more layers, including a first region providing pre-filtering and consisting of medium efficiency media, a second region of greater efficiency and finer media that removes the oil mists from the blow-by stream, and a third region of coarse media and providing coalescing that allows collected oil to drain through the bottom and shed off of the bottom of the element. The media is oriented for top to bottom flow in the housing. A plastic frame is molded directly to the media. The media and frame are made of similar compounds so no adhesive is required to attach the media and frame. The heat from molding the frame fuses the frame and media together. A gasket provides a seal between the element, both chambers of the valve cover and the plastic CCV cover. The molded frame complements upper and lower plenums in the flat low profile housing. A double lip gasket around the entire perimeter creates a seal by compression and also by deflection of rubber or other gasket material. The gasket defines a seal for the filtration system with multiple chambers. Engine blow-by gas enters the first chamber formed by the valve cover, plastic cover and element seal and then is routed into the upper plenum and then flows downwardly through multiple media layers to the lower plenum. Oil that is captured by the media is released to the bottom of the housing and drained from the system. Air exits the bottom chamber through a separate outlet from the oil drain.

BRIEF DESCRIPTION OF THE DRAWINGS

Parent Invention

FIGS. 1–19 are from the noted '819 application.

FIG. 1 is a perspective view of a diesel engine crankcase ventilation filter in accordance with the parent invention.

FIG. 2 is an exploded perspective view of the assembly of FIG. 1.

FIG. 3 is disassembled exploded perspective view of a portion of FIG. 2.

FIG. 4 is a top view partially in section of a portion of FIG. 1.

FIG. 5 is a sectional view taken along line 5—5 of FIG. 4.

FIG. 6 is an enlarged sectional view of a portion of the inlet side of FIG. 5.

FIG. 7 is an enlarged sectional view of a portion of the outlet side of FIG. 5.

FIG. 8 is a sectional view taken along line 8—8 of FIG. 4.

FIG. 9 is a sectional view taken along line 9—9 of FIG. 4.

FIG. 10 is a sectional view taken along line 10—10 of FIG. 4.

FIG. 11 is a sectional view taken along line 11—11 of FIG. 4.

FIG. 12 is a sectional view taken along line 12—12 of FIG. 4.

FIG. 13 is like FIG. 12 and shows another position of the bypass valve.

FIG. 14 is a sectional view taken along line 14—14 of FIG. 4.

FIG. 15 is a sectional view taken along line 15—15 of FIG. 4.

FIG. 16 is an enlarged top view of a portion of FIG. 4 as shown at line 16—16.

FIG. 17 is a sectional view taken along line 17—17 of FIG. 16.

FIG. 18 is like FIG. 17 and shows another position of the drain valve.

FIG. 19 is a perspective view of the drain valve plunger of FIGS. 17 and 18.

Companion Application

Figure 20:
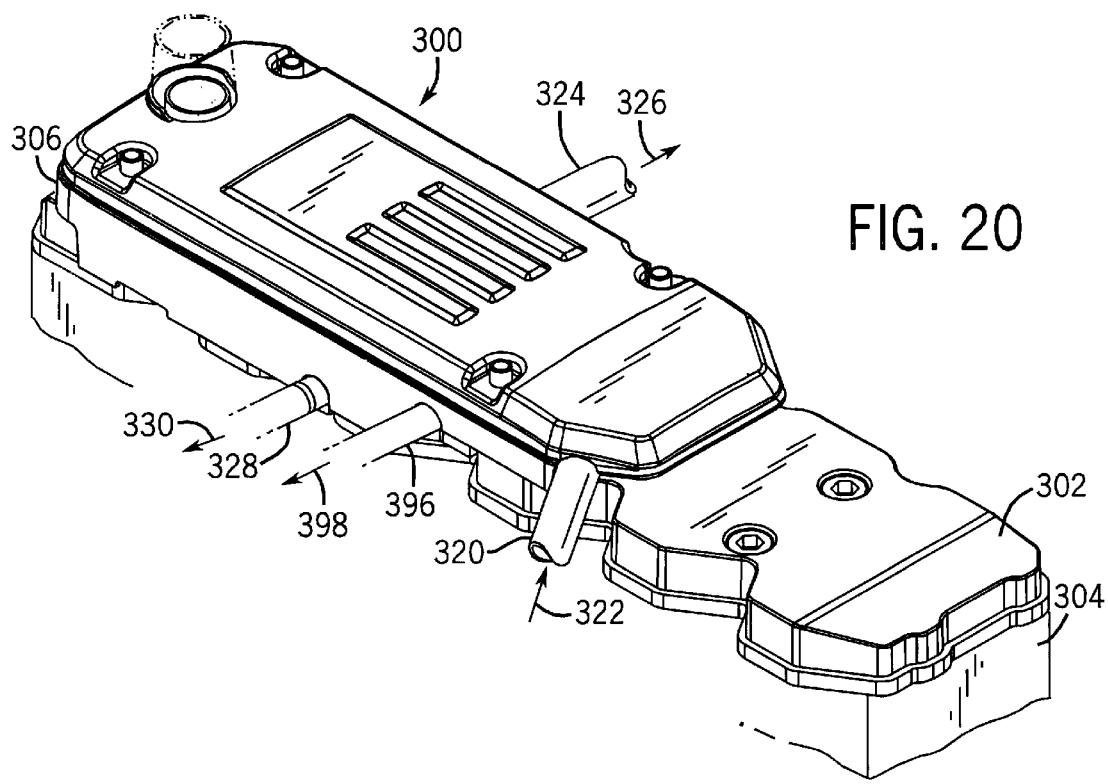

FIG. 20 is a perspective view of a diesel engine crankcase ventilation filter in accordance with the invention of the noted companion application.

Figure 21:
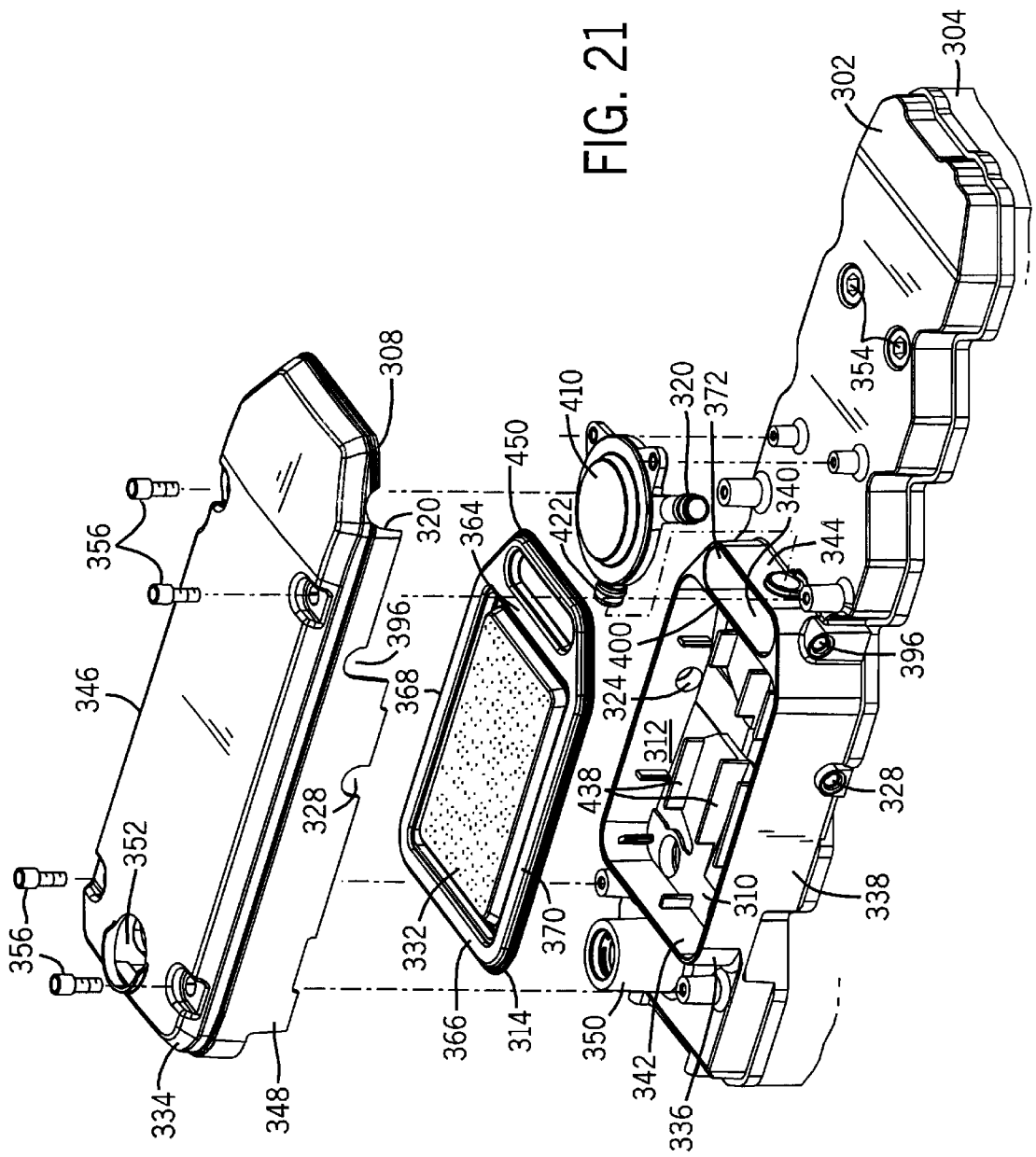

FIG. 21 is an exploded perspective view of the assembly of FIG. 20.

FIG. 22 is a top plane view of the assembly of FIG. 20.

FIG. 23 is a sectional view taken along line 23—23 of FIG. 22.

FIG. 24 is a top view like FIG. 22 but partially cut away.

FIG. 25 is an elevation view from below of the upper housing section cover of FIG. 21.

Figure 26:
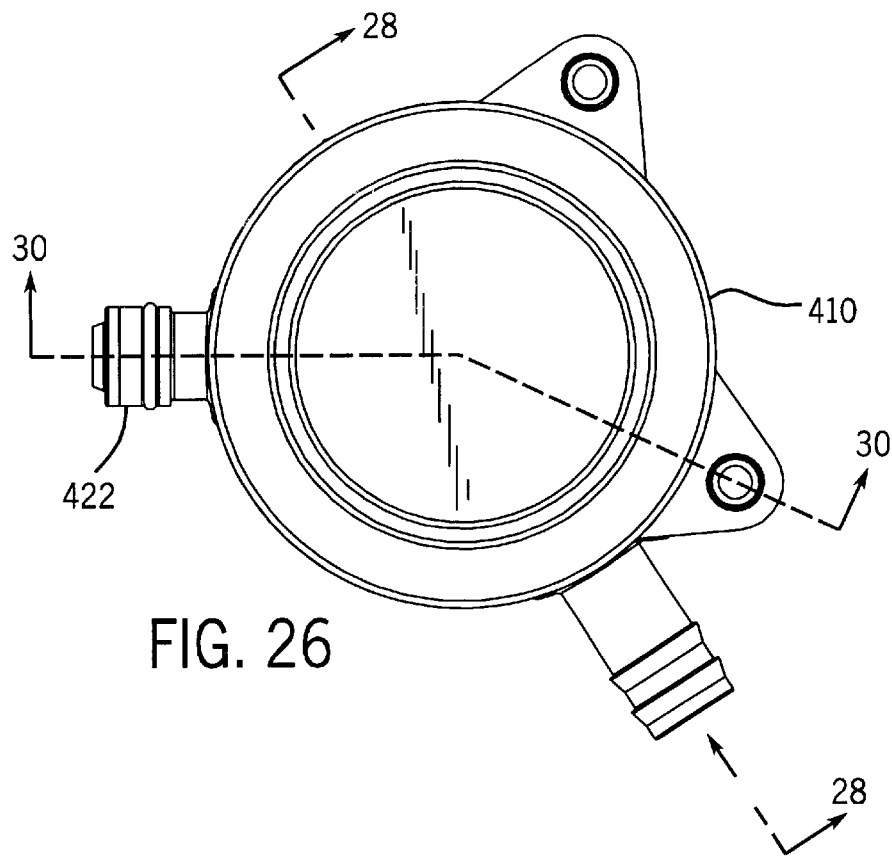

FIG. 26 is a top elevation view of a portion of the structure of FIG. 24.

Figure 27:
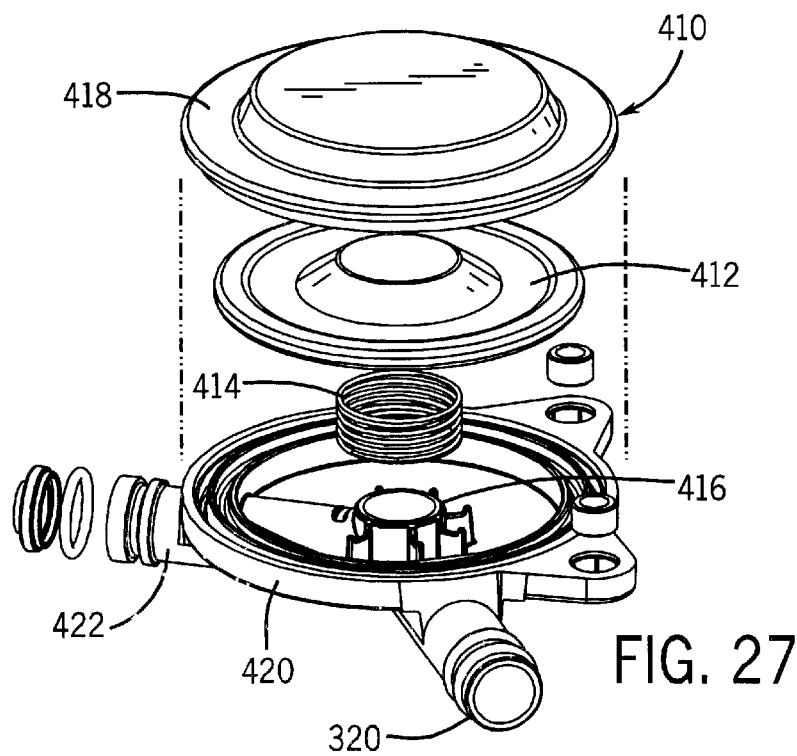

FIG. 27 is an exploded perspective view of the assembly of FIG. 26.

Figure 28:
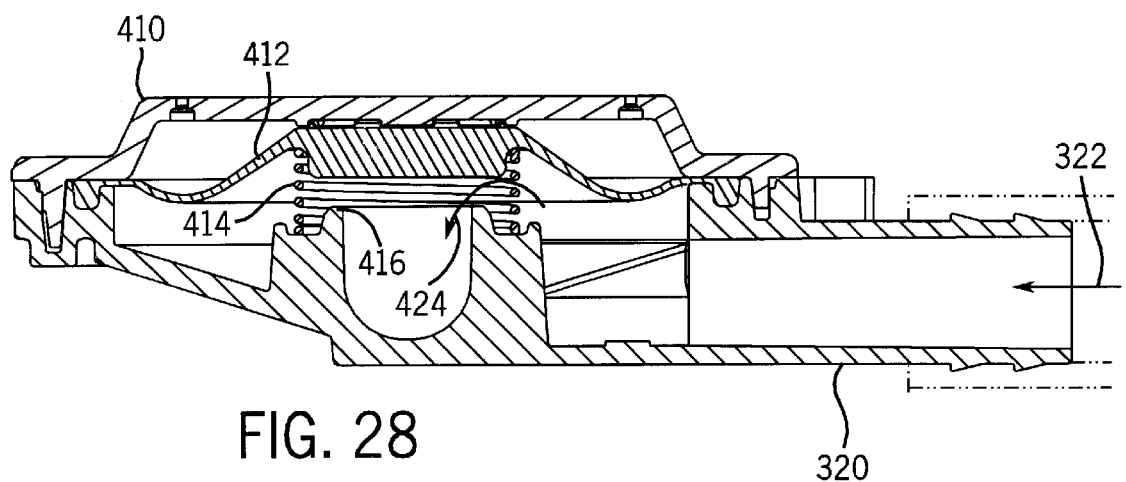

FIG. 28 is a sectional view taken along line 28—28 of FIG. 26.

Figure 29:
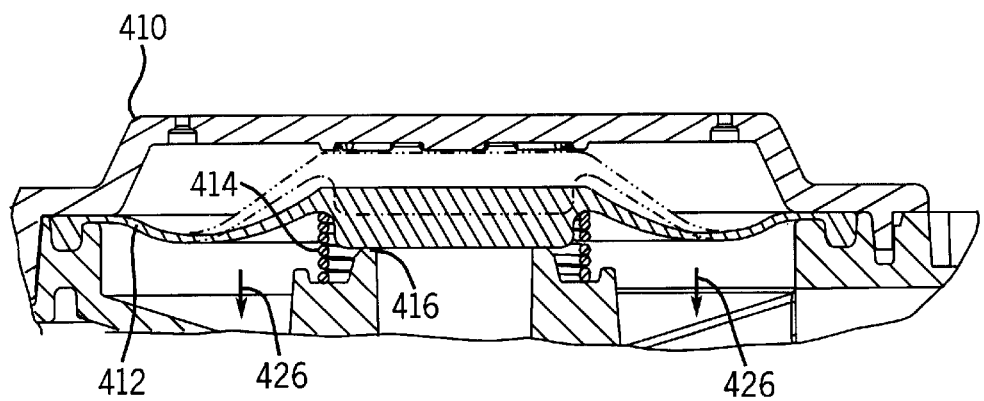

FIG. 29 is a view of a portion of the structure of FIG. 28 and showing an alternate position.

Figure 30:
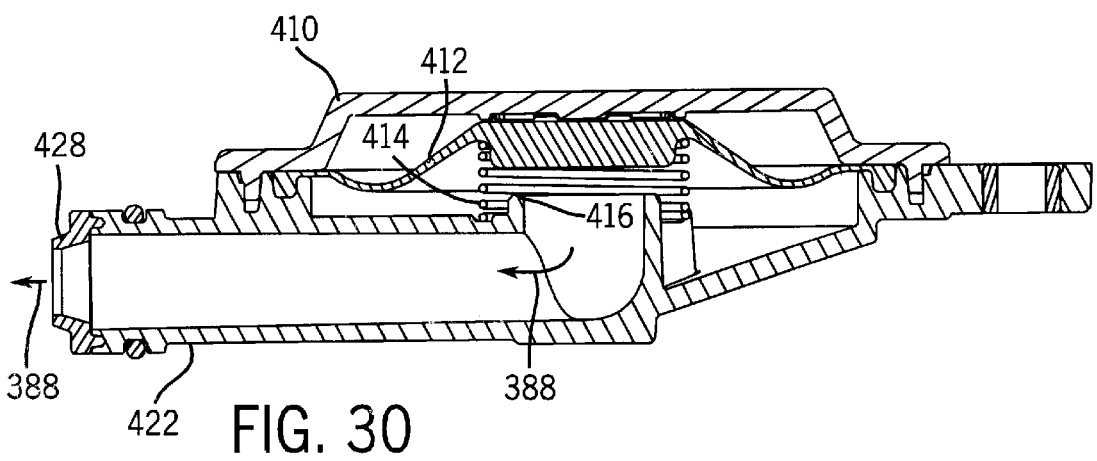

FIG. 30 is a sectional view taken along line 30—30 of FIG. 26.

Figure 31:
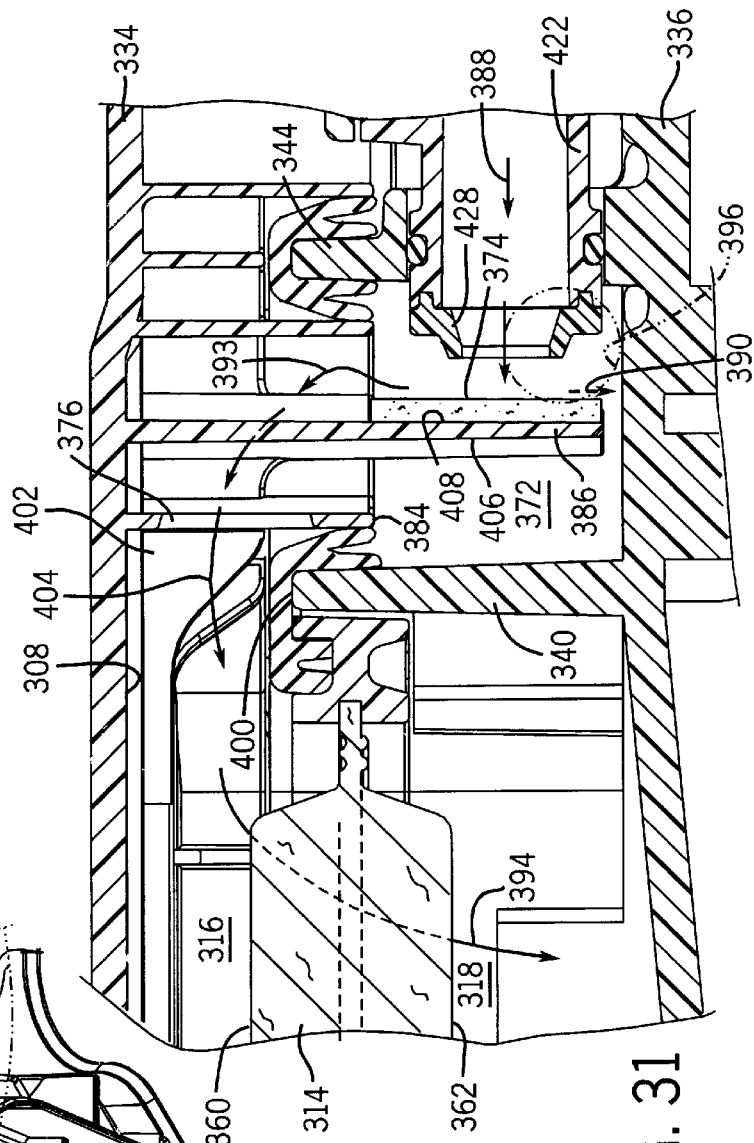

FIG. 31 is an enlarged sectional view of a portion of the structure of FIG. 23 as shown at line 31—31.

Figure 32:
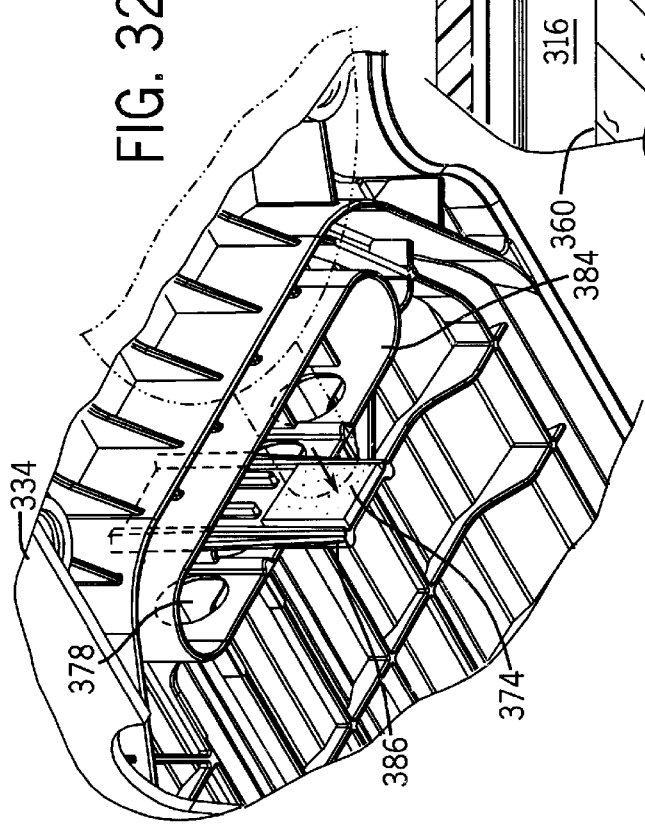

FIG. 32 is a perspective view from below of a portion of the upper housing section cover of FIG. 21.

Figure 33:
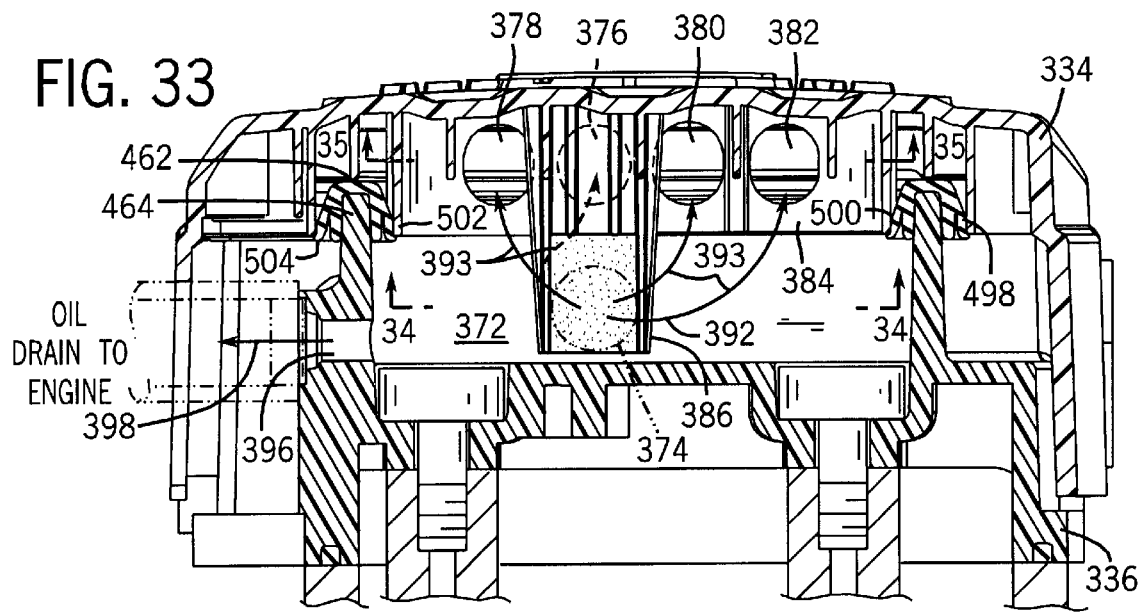

FIG. 33 is a sectional view taken along line 33—33 of FIG. 24.

Figure 34:
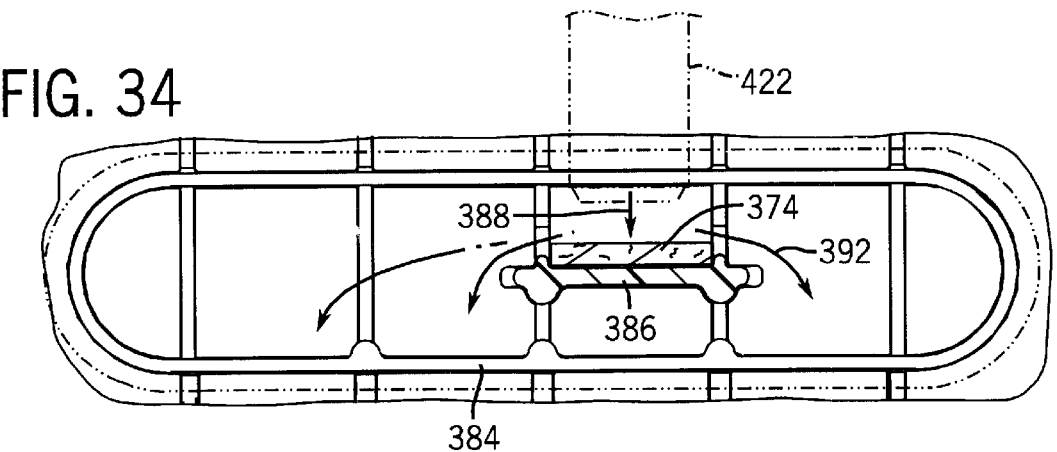

FIG. 34 is a sectional view taken along line 34—34 of FIG. 33.

Figure 35:
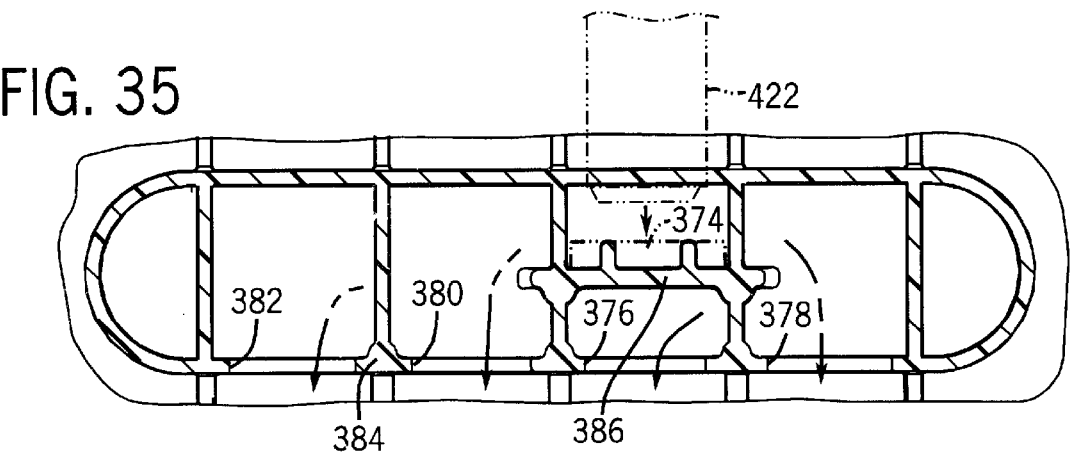

FIG. 35 is a sectional view taken along line 35—35 of FIG. 33.

Figure 36:
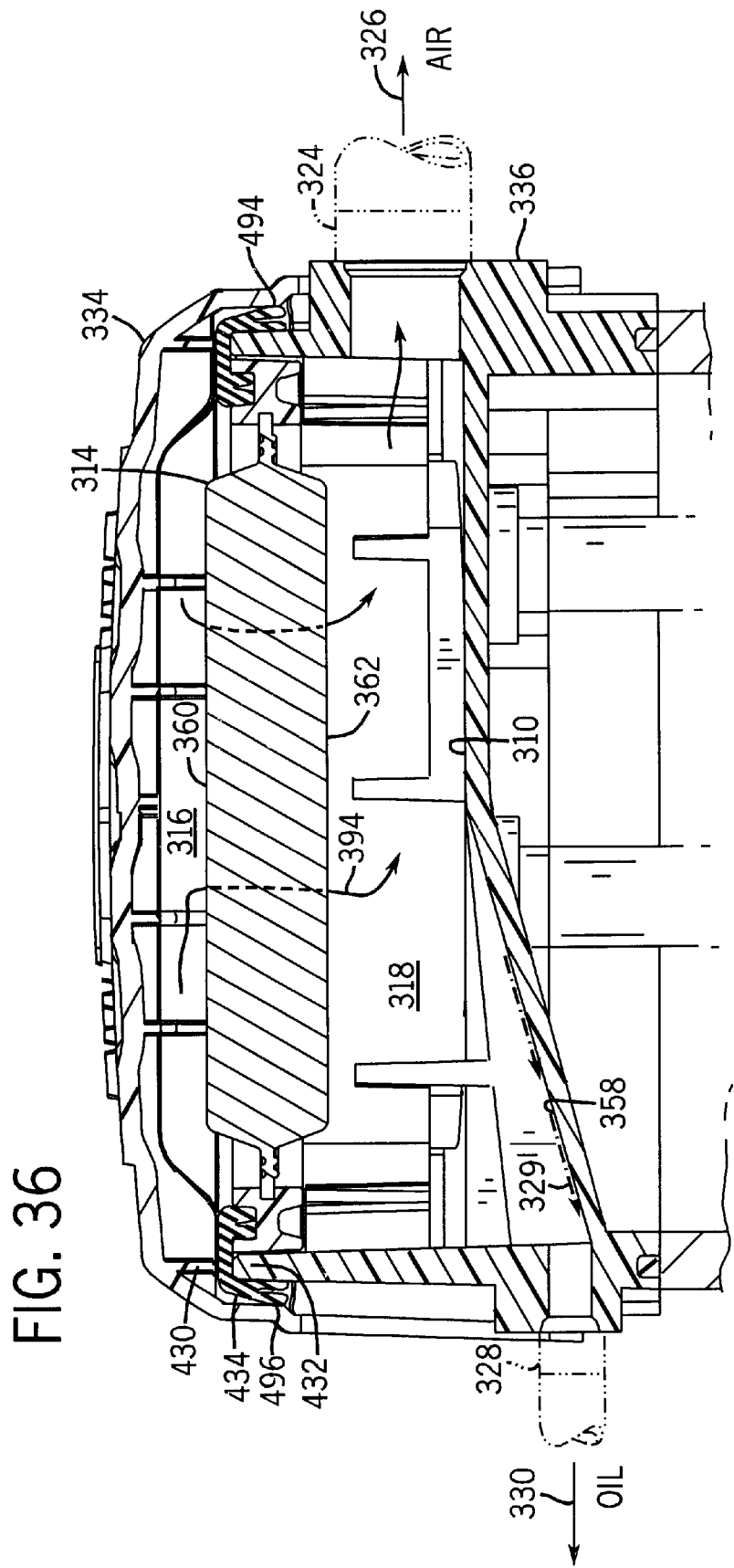

FIG. 36 is a sectional view taken along line 36—36 of FIG. 22.

Present Invention

Figure 37:
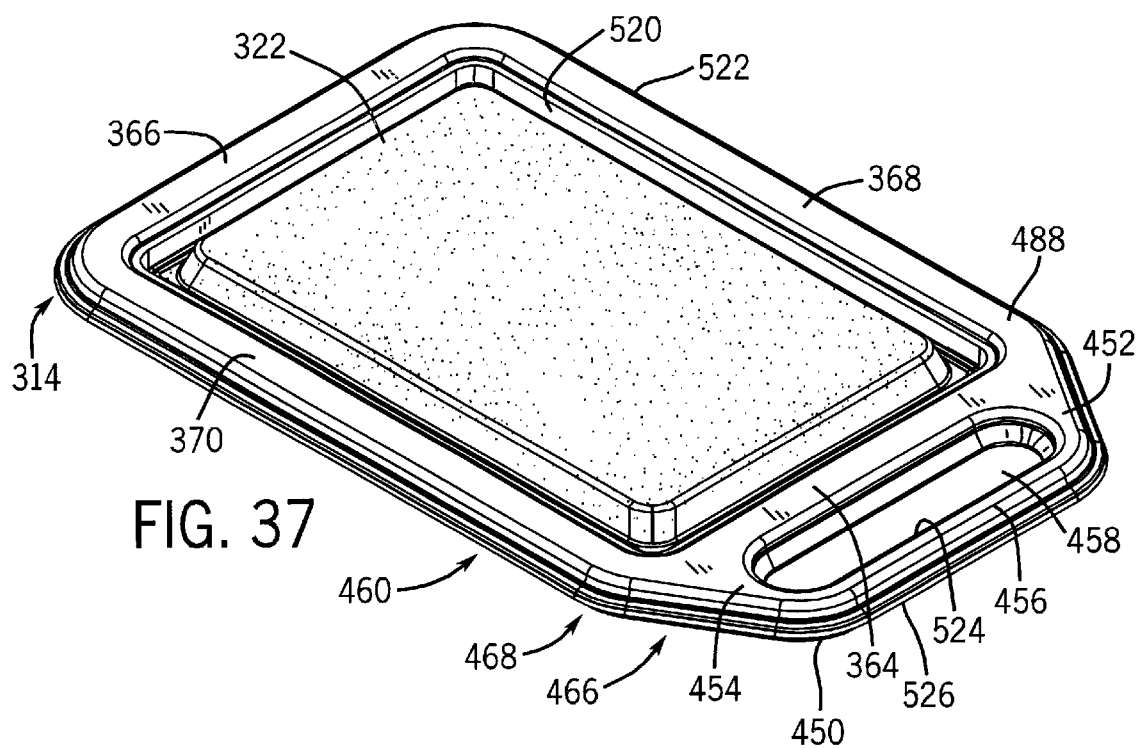

FIG. 37 is a perspective view of a flat panel filter element in accordance with the present invention.

Figure 38:
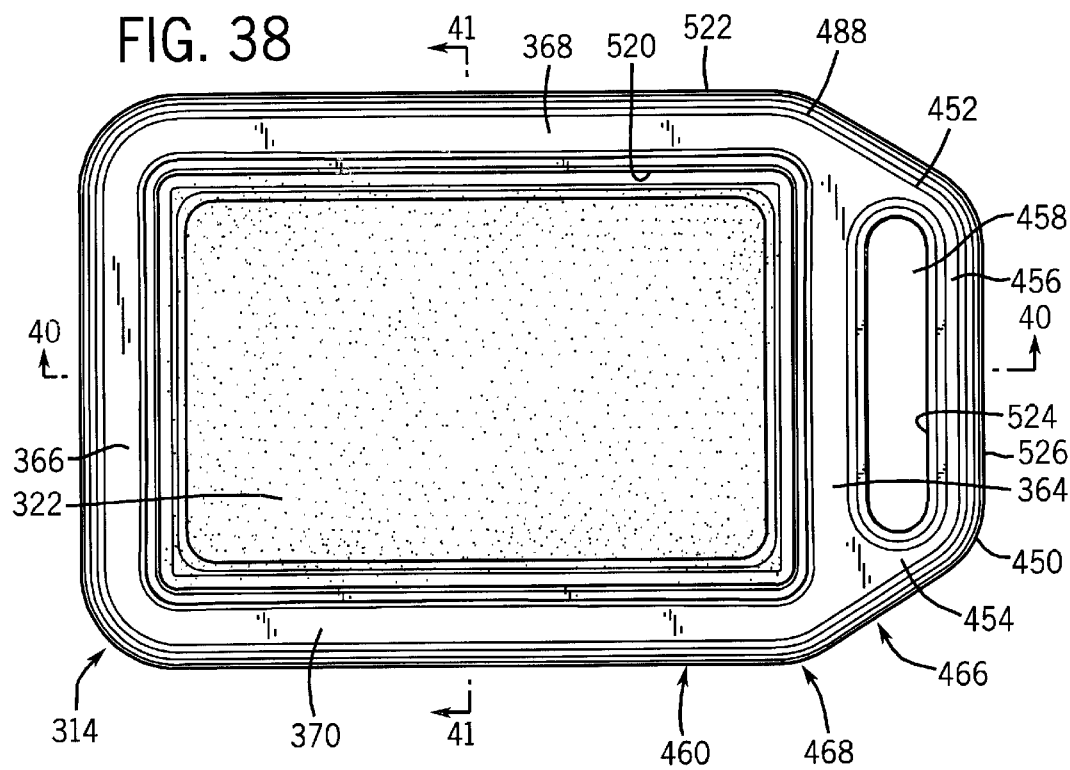

FIG. 38 is a top elevation view of the element of FIG. 37.

Figure 39:
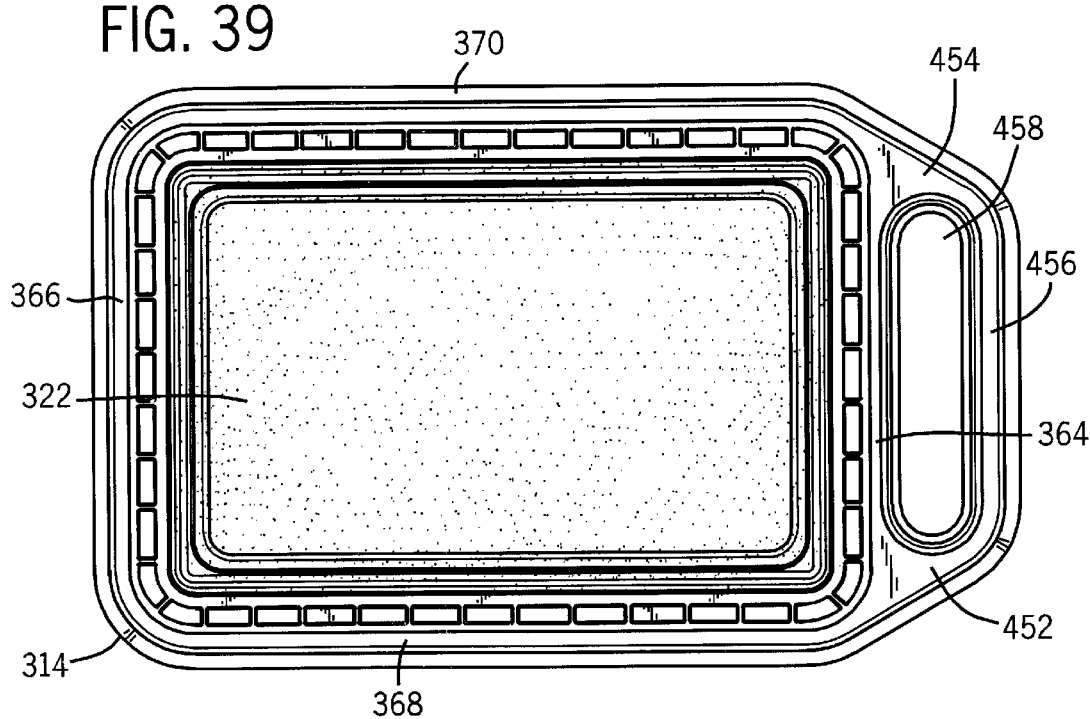

FIG. 39 is a bottom elevation view of the element of FIG. 37.

FIG. 40 is a sectional view taken along line 40—40 of FIG. 38.

FIG. 41 is a sectional view taken along line 41—41 of FIG. 38.

Figure 42:
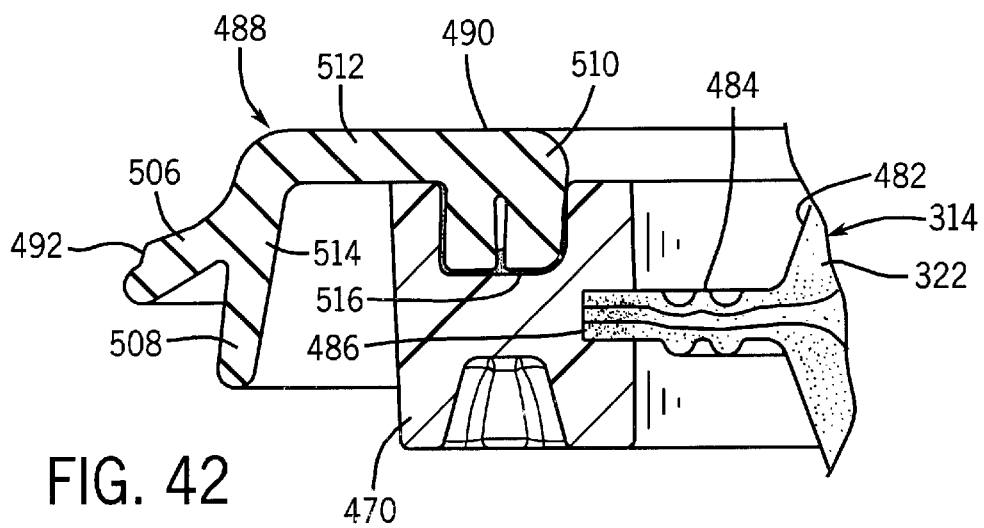

FIG. 42 is an enlarged sectional view of a portion of the structure of FIG. 40 as shown at line 42—42.

FIG. 43 is an enlarged and further detailed view of a portion of the structure of FIG. 40 as shown at line 43—43.

Figure 44:
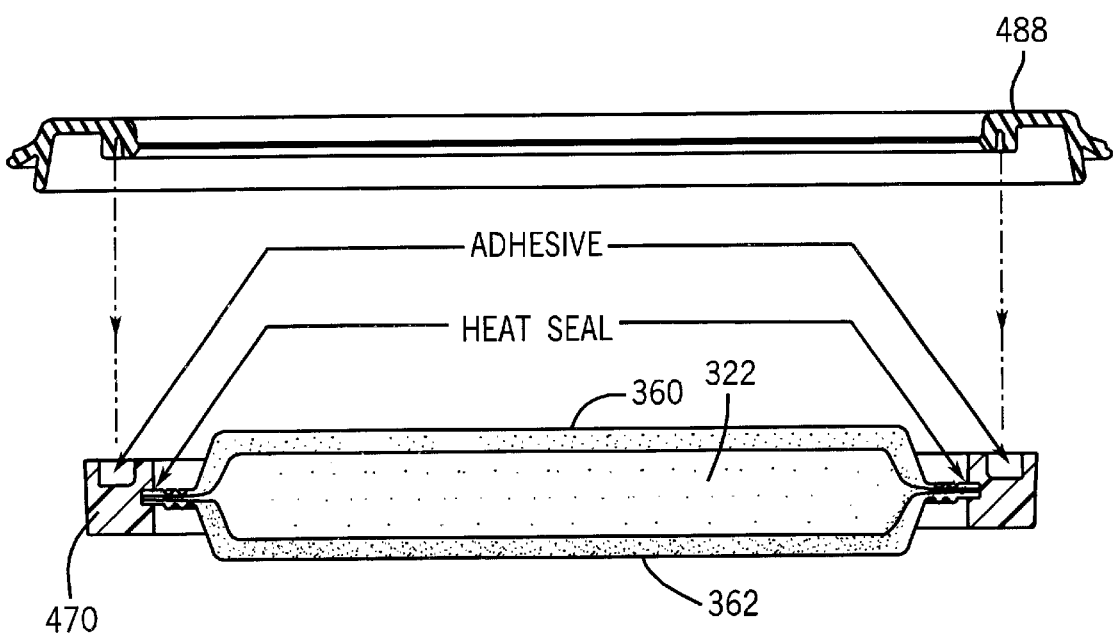

FIG. 44 is an exploded view of the assembly of FIG. 41.

DETAILED DESCRIPTION OF THE INVENTION

The following description relating to FIGS. 1–19 is taken from the noted parent '819 application.

Figure 1:
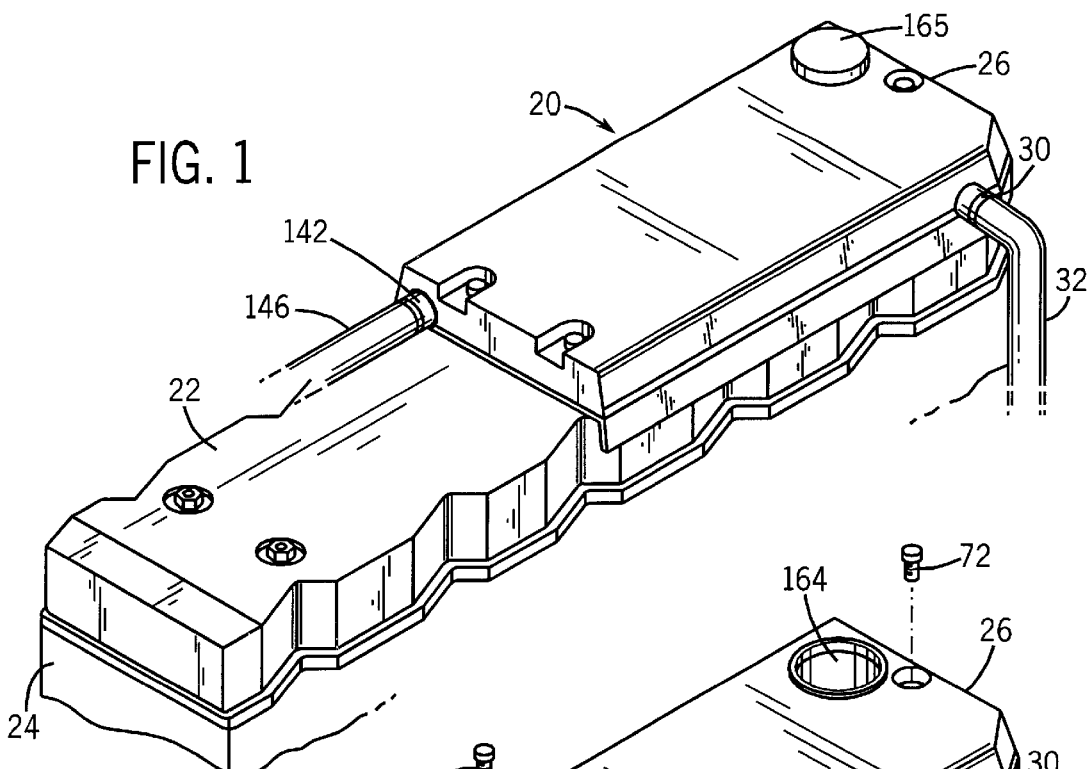

FIG. 1 shows a crankcase ventilation filter 20, CCV, mounted to valve cover 22 of diesel engine 24. The crankcase ventilation filter includes a low profile filter housing 26, FIG. 2, having an inlet 28, FIGS. 3–5, receiving oil and air from the diesel engine, and an outlet 30 returning air to the diesel engine, for example, by hose 32 connected to either the clean side or the dirty side of the air filter or to the turbocharger. A flat panel filter element 34, FIGS. 3–5, in housing 26 receives the oil and air from inlet 28, separates the oil from the air, and passes the air to outlet 30. As will be more fully described hereinafter, oil and air flow upwardly from the diesel engine through filter housing inlet 28 and are directed by intake plenum 36 around the left end 38 of filter element 34 to the top planar face 40 of the filter element and then flow downwardly through the filter element to the lower planar face 42 thereof, with the oil mist, soot and particles coalescing in the filter, and the air then flows around the right end 44 of filter element 34 and is directed by exit plenum 46 to outlet 30.

Figure 2:
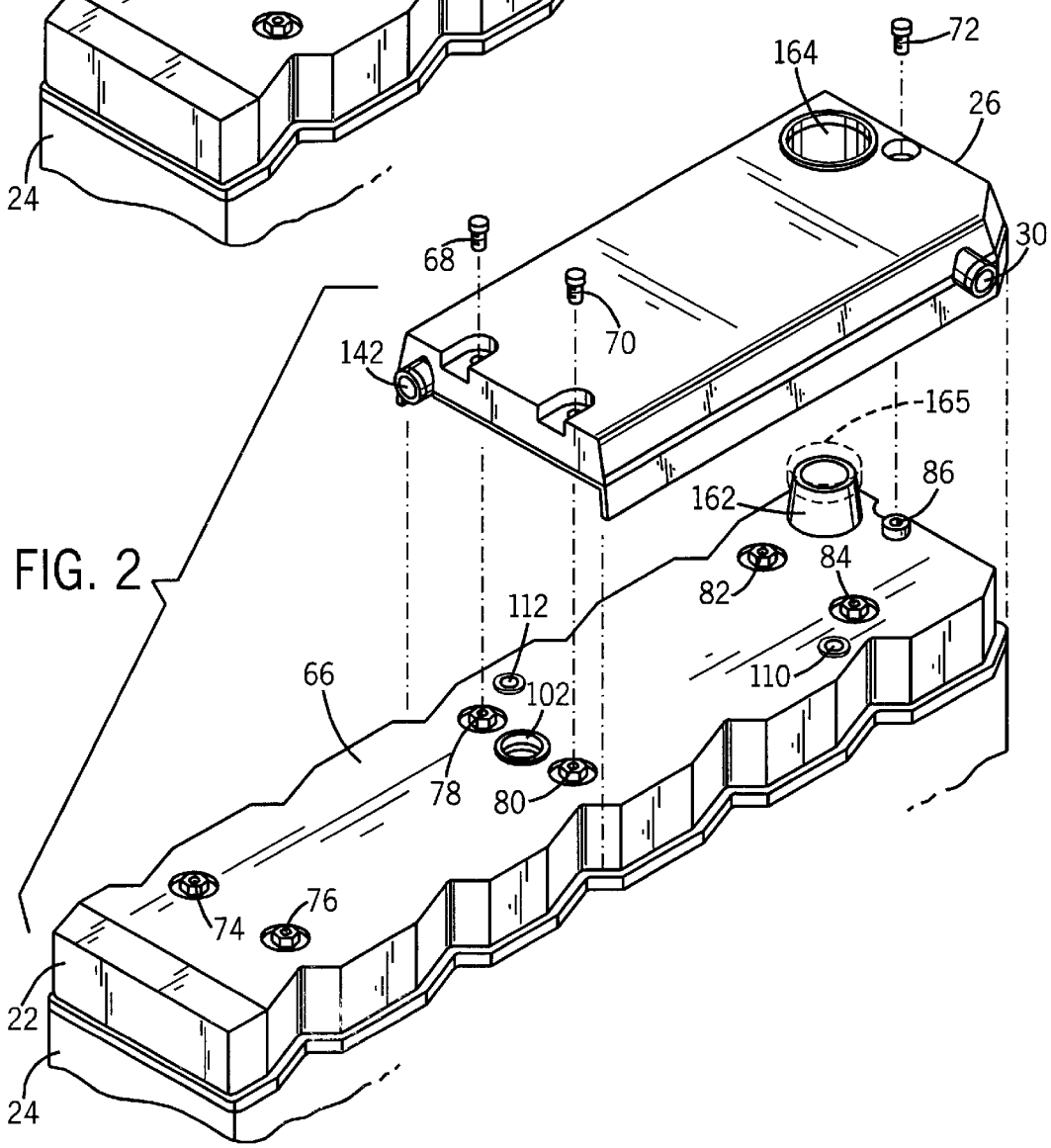
Figure 3:
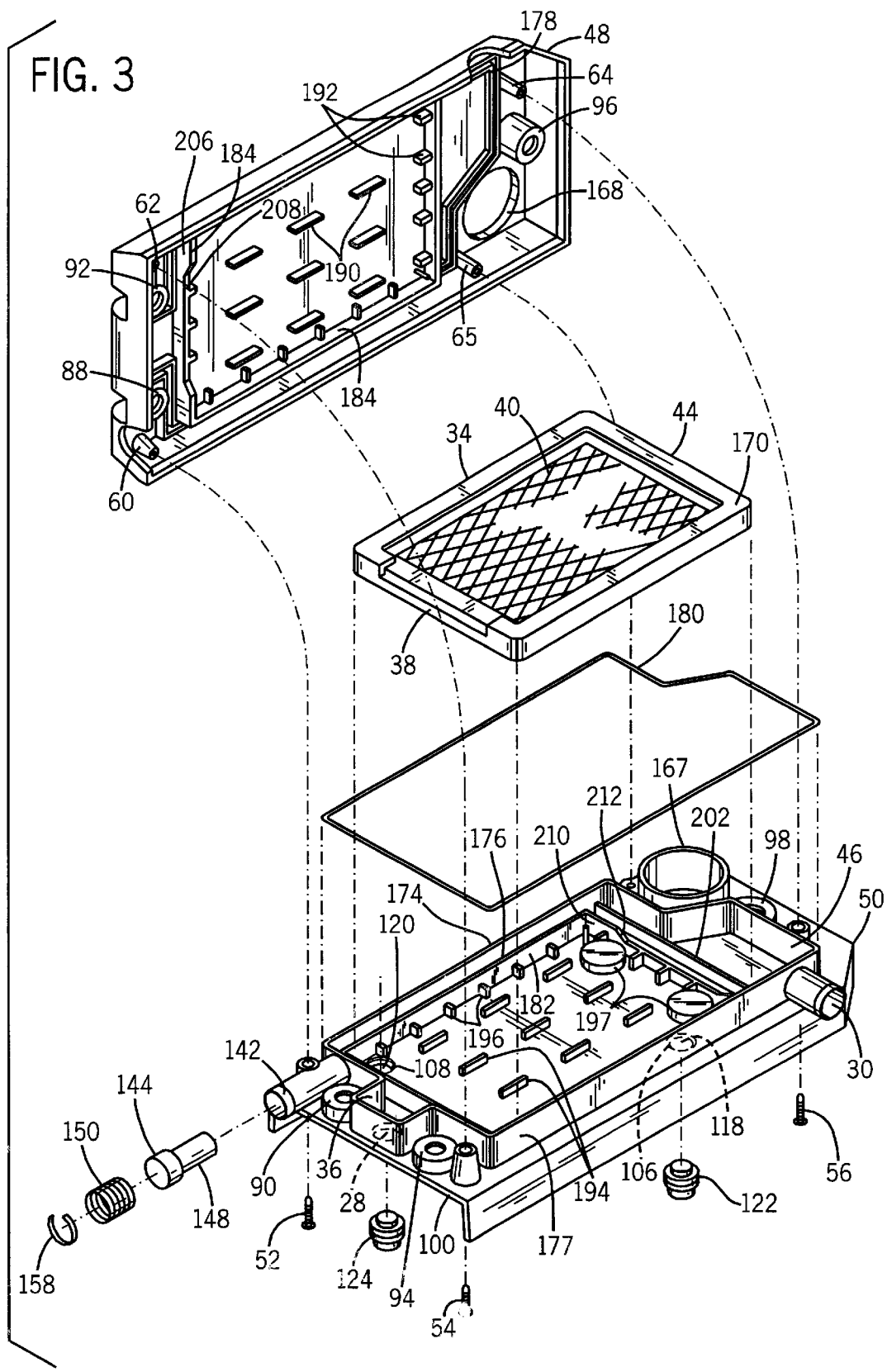
Figure 4:
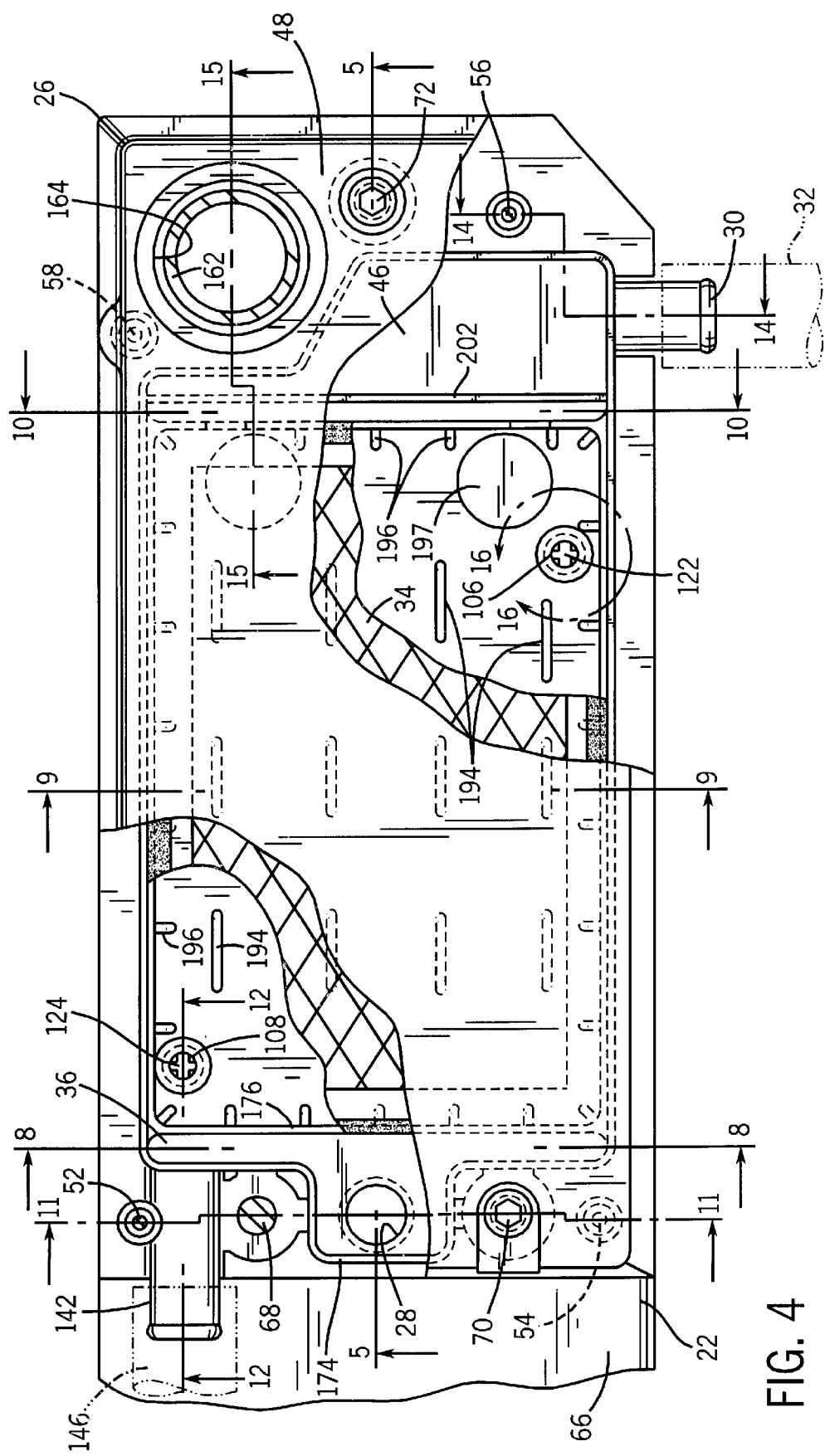
Figure 8:
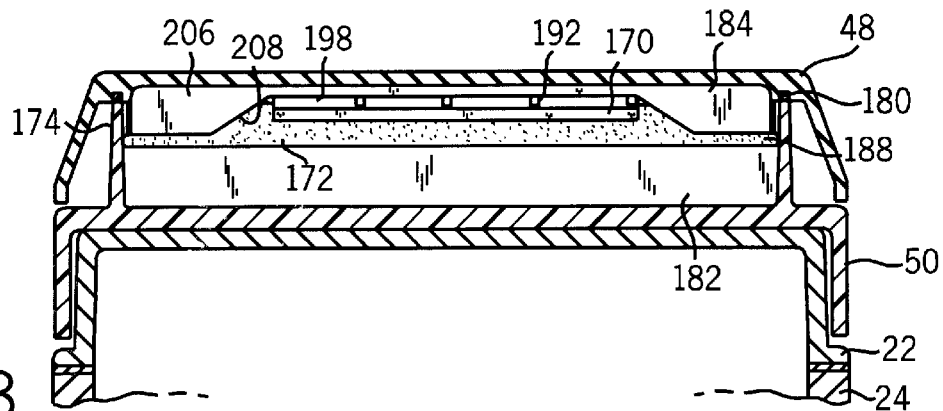
Figure 9:
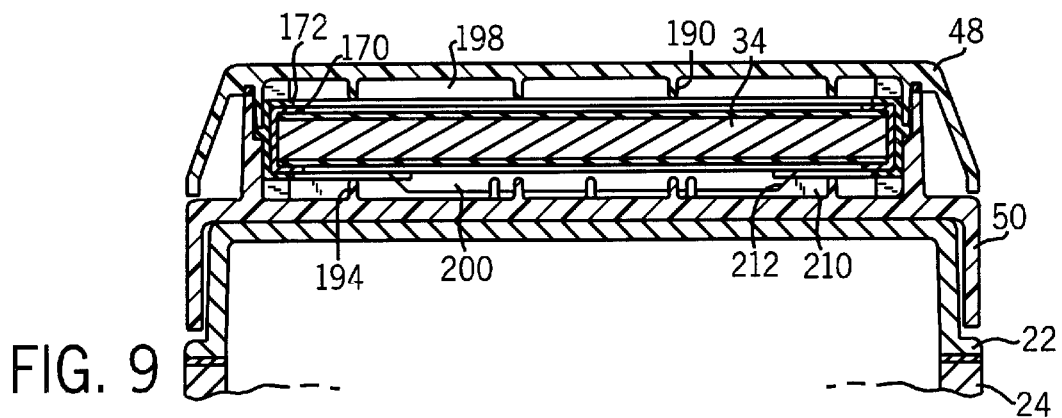
Figure 10:
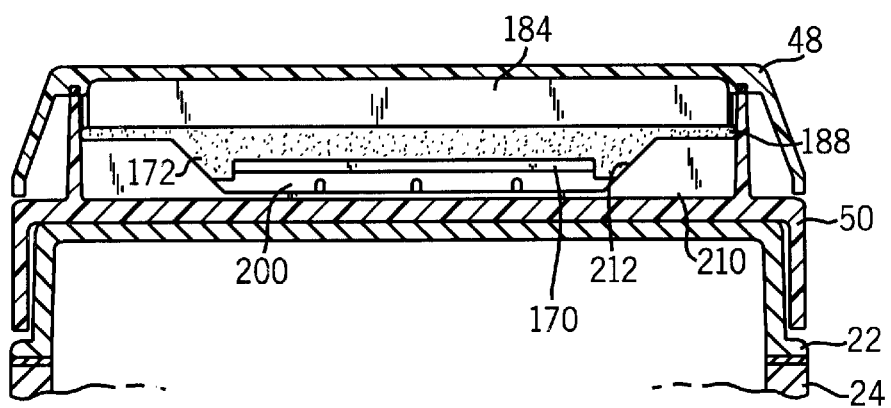
Figure 11:
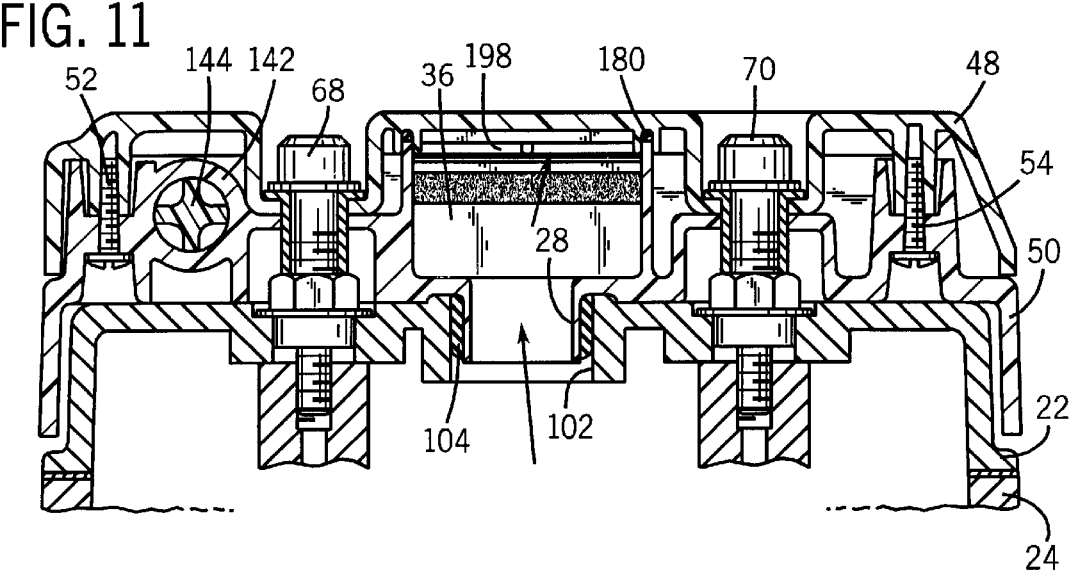
Figure 14:
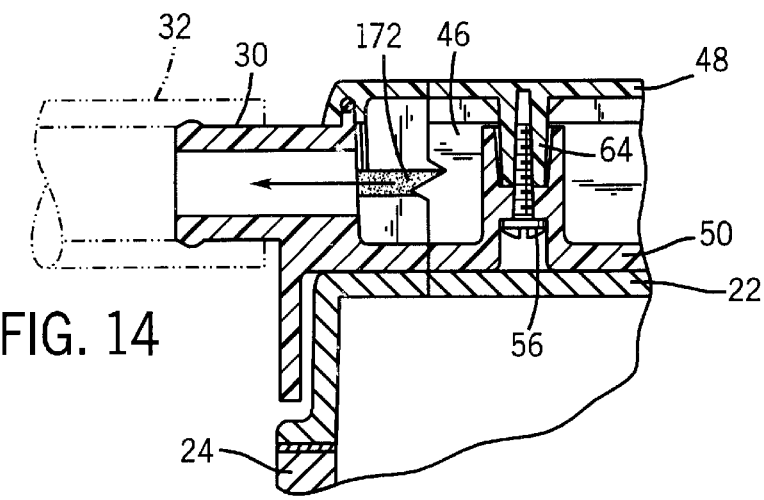
Figure 15:
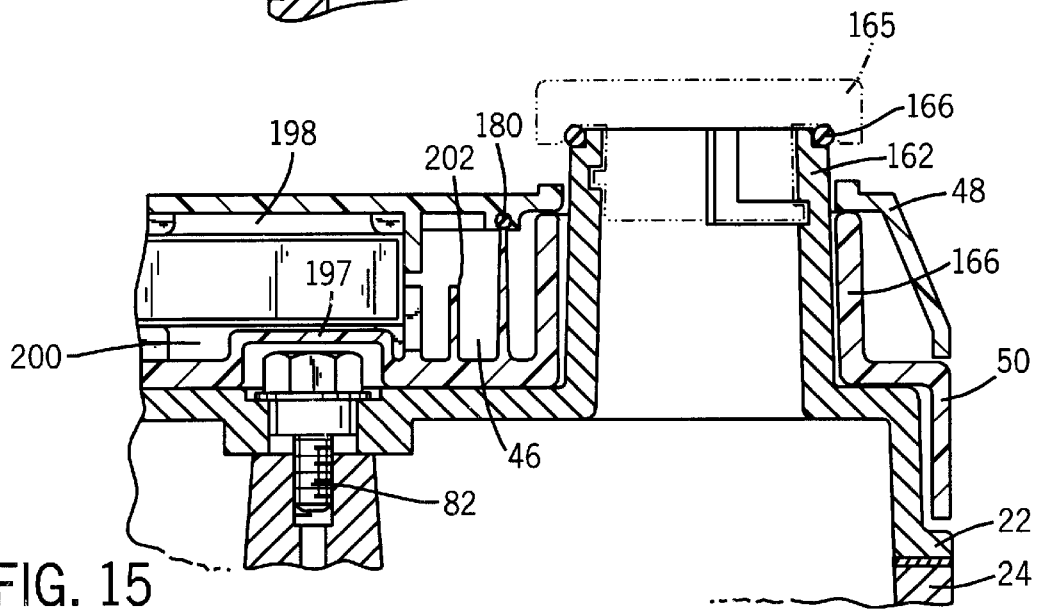

Housing 26 is formed by upper and lower mating plastic housing sections 48 and 50, FIG. 3, attached to each other by screws 52, 54, 56, 58 extending upwardly through lower housing section 50 and threaded into respective formed bosses 60, 62, 64, 65 in upper housing section 48. Assembled housing 26 is mounted on top of the diesel engine, preferably on upper planar surface 66 of valve cover 22, by bolts 68, 70, 72, FIG. 2. Valve cover 22 is mounted to engine 24 by bolts 74, 76, 78, 80, 82, 84. Bolts 68 and 70 are threaded into the heads of bolts 78 and 80. Bolt 72 is threaded into boss 86 of valve cover 22. Bolt 68 extends through alignment and spacing bosses 88 and 90 in upper and lower housing sections 48 and 50, respectively. Bolt 70 extends through alignment and spacing bosses 92 and 94 in upper and lower housing sections 48 and 50, respectively. Bolt 72 extends through alignment and spacing bosses 96 and 98 in upper and lower housing sections 48 and 50, respectively. The plane of flat panel filter element 34 and the plane of flat low profile filter housing 26 and the plane of upper planar surface 66 are all parallel and horizontal.

Lower housing section 50 of flat low profile filter housing 26 has a lower surface 100 with an opening 28 therethrough providing the noted inlet. Valve cover 22 has an opening 102 in its upper surface 66 mating with opening 28 of lower surface 100 of the filter housing in sealed relation at rubber grommet 104, FIG. 11, and providing a direct inlet passage for transmission of oil and air from the diesel engine to filter housing 26. Lower surface 100 of lower housing section 50 of flat low profile filter housing 26 has second and third openings 106 and 108 therethrough, FIGS. 3 and 4. Upper surface 66 of valve cover 22 has second and third openings 110 and 112 therethrough mating with respective openings 106 and 108 in lower surface 100 of the filter housing in sealed relation at respective rubber grommets 114 and 116, FIGS. 17 and 12, respectively, and providing direct drain passages 118 and 120 for transmission of separated oil from filter housing 26 back to the diesel engine.

Drain valves 122 and 124, FIG. 3, are provided in respective drain passages 118 and 120. Each drain valve has a lower open position, FIGS. 12 and 17, permitting flow of separated oil from low profile filter housing 26 back to the diesel engine. Each drain valve has an upper closed position, FIGS. 13 and 18, blocking the noted flow. Each drain valve is gravity biased to the noted lower open position. Each drain valve is moved to the noted upper closed position by pressure in valve cover 22 during operation of the diesel engine. Each drain valve includes a gravity biased vertically reciprocal plunger 126, FIG. 19, with upper and lower cross-shaped stalks 128 and 130 guiding plunger movement within the grommet such as 114 and permitting flow therealong between the spokes of the cross-member. A central flange 132 has an upper surface 134 abutting grommet shoulder seal bead surface 136, FIG. 18, in the closed position of the valve and providing a seal thereagainst. The outer perimeter of flange 134 has cut-out sections 138 permitting flow therepast in the downward open position of the valve, FIG. 17, including when flange 132 rests against frusto-conical surface 140 of grommet 114.

Figure 12:
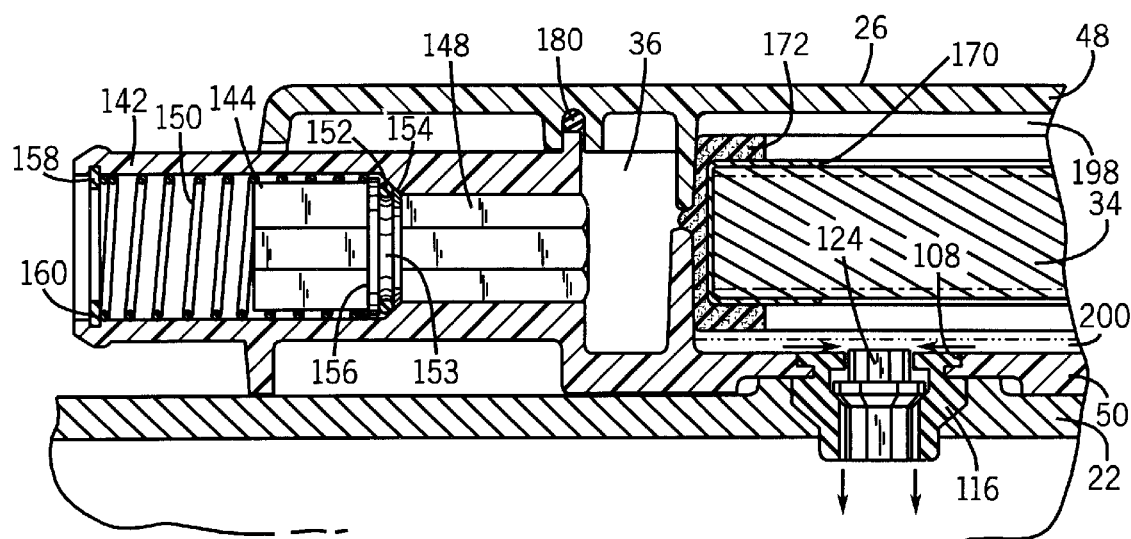
Figure 13:
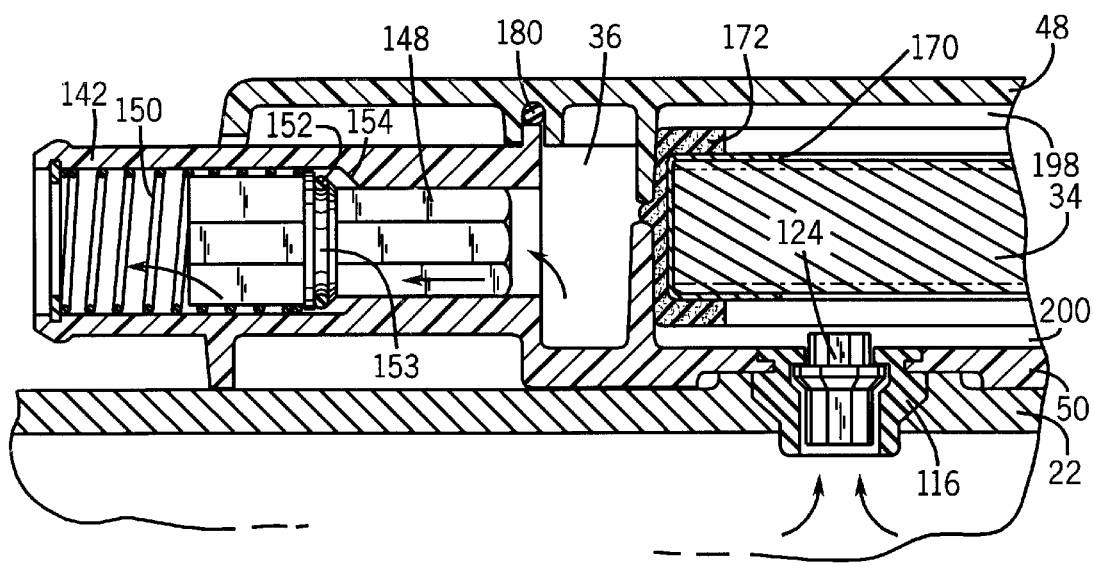
Figure 16:
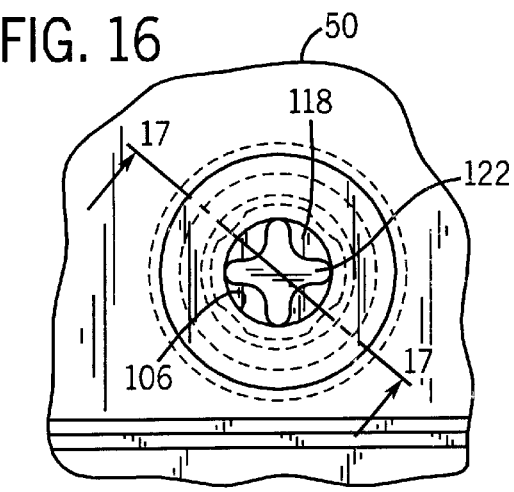
Figure 19:
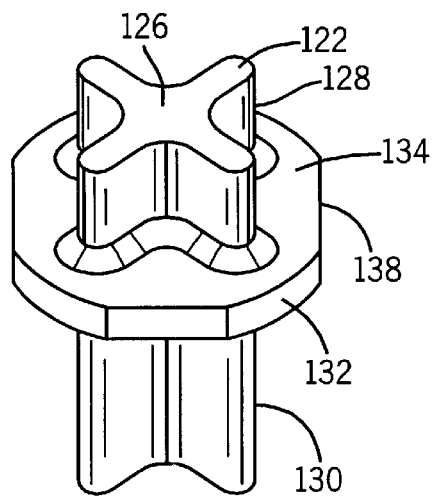
Figure 17:
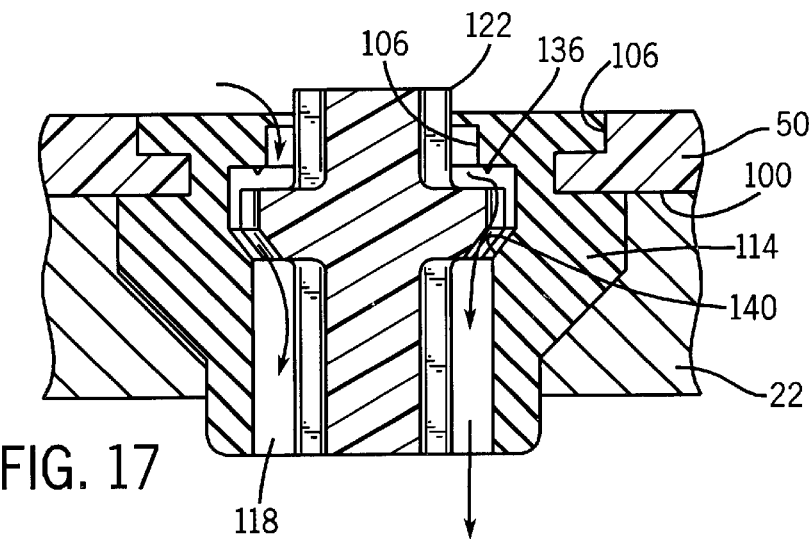
Figure 18:
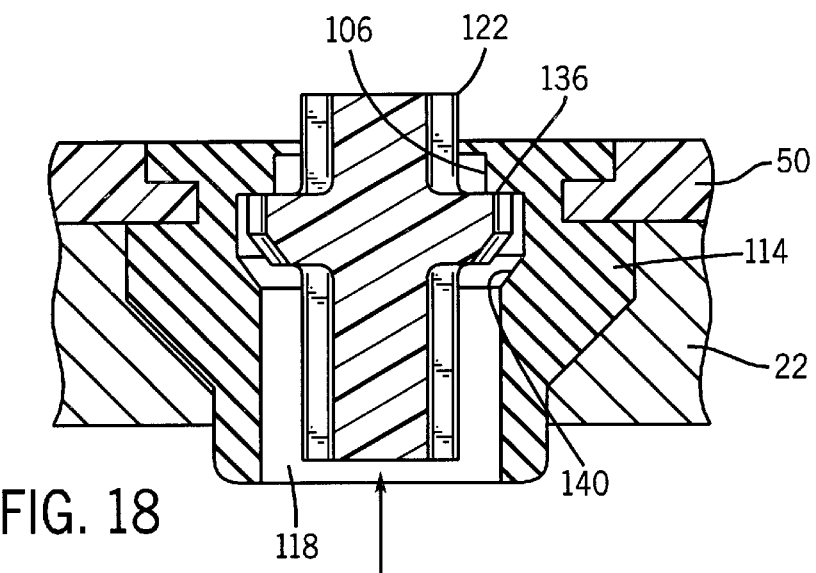

Flat low profile filter housing 26 has a bypass port 142, FIG. 3, formed in lower housing section 50 and communicating with inlet 28 through intake plenum 36. A bypass valve 144 is provided in bypass port 142. Bypass valve 144 has a normally closed position, FIG. 12, such that oil and air from inlet 28 and intake plenum 36 flow to top face 40 of flat panel filter element 34. Bypass valve 144 has a pressure actuated open position, FIG. 13, passing the oil and air therethrough as an alternate path, for example, through hose 146 to atmosphere. The bypass valve is actuated to the open position in response to a predetermined pressure drop across flat panel filter element 34 between upper and lower faces 40 and 42. Bypass valve 144 includes a reciprocal plunger 148, FIG. 12, biased to the noted closed position, which is rightwardly as shown in FIG. 12, by a calibration spring 150 supplying bias. The bias of calibration spring 150 is overcome at the noted predetermined pressure drop, which is sensed as backpressure in intake plenum 36, which causes leftward compression of spring 150 as shown in FIG. 13. In the closed position of the valve FIG. 12, O-ring 152 carried in annular groove 153 on plunger 148 is seated against frusto-conical surface 154 in bypass port 142 in sealing relation. In the noted open position, FIG. 13, plunger 148 moves leftwardly, and O-ring 152 moves away from frusto-conical sealing surface 154 to permit flow of oil and air therepast. Spring 150 bears at its rightward end against plunger shoulder 156, and at its leftward end against C-shaped stop ring 158 held in annular groove 160 in the bypass port.

An oil fill tube 162, FIG. 2, extends through flat low profile filter housing 26 and communicates with the interior of valve cover 22 to provide an oil fill inlet for adding oil to the diesel engine. Housing 26 has an opening 164 therethrough through which oil fill tube 162 extends in isolation from flat panel filter element 34. Oil fill tube 162 is closed by cap 165 sealed at O-ring 166, FIG. 15. Oil fill tube 162 is integrally formed with and extends from valve cover 22 through opening 164 in housing 26. Opening 164 in the housing is formed by cylinder 167 integrally formed with and extending upwardly from lower housing section 50 to upper housing section 48 at aperture 168. Oil fill tube 162 extends along a generally vertical direction perpendicular to the horizontal plane of flat low profile filter housing 26 and parallel to the vertical direction of oil and air flow through inlet 28.

Flat panel filter element 34 has the noted upper and lower distally opposite facing planar faces 40 and 42. Upper face 40 communicates with inlet 28 through intake plenum 36. Lower face 42 communicates with outlet 30 through exit plenum 46. Faces 40 and 42 span along the plane of flat panel filter element 34 between left and right distally opposite ends 38 and 44. Inlet 28 and bypass port 142 are adjacent left end 38 of flat panel filter element 34. Outlet 30 and oil fill tube 162 are adjacent right end 44 of flat panel filter element 34. The direction of flow of oil and air through inlet 28 is generally upward and vertical, and perpendicular to the horizontal plane of flat panel filter element 34, as noted. The direction of oil and air flow through bypass port 142 is generally horizontal and in the plane of flat panel filter element 34 and perpendicular to the noted direction of oil and air flow through inlet 28. The direction of air flow through outlet 30 is generally horizontal and in the plane of flat panel filter element 34 and perpendicular to the noted direction of oil and air flow through bypass port 142 and perpendicular to the noted direction of oil and air flow through inlet 28. The direction of separated oil drain through ports 106 and 108 is generally vertically downward and perpendicular to the horizontal plane of flat panel filter element 34 and parallel and in the opposite direction to the noted direction of flow of oil and air through inlet 28 and perpendicular to the noted direction of oil and air flow through bypass port 142 and perpendicular to the noted direction of air flow through outlet 30.

Flat panel filter element 34 includes one or more layers of depth media between upper and lower screens at the noted upper and lower faces 40 and 42, supported and bound between a metal end cap 170 around the perimeter thereof. Around the outside of end cap 170 is a soft rubber or open cell urethane gasket 172, FIG. 6. Upper and lower housing sections 48 and 50 mate in assembled condition to define an outer border fence 174, FIG. 3, and an inner border fence 176. Outer border fence 174 is provided by a wall 177 extending upwardly from lower housing section 50 and mating with the upper housing section 48 at groove 178 therein and sealed thereto at shaped sealing gasket 180. Inner border fence 176 is formed by partial height wall 182 extending upwardly from lower housing section 50, and partial height wall 184 extending downwardly from upper housing section 48, and facing each other across a small gap 186, FIG. 6 gripping and pinching and bulging a portion 188 of gasket 172 therebetween in sealing relation, to seal the border of flat panel filter element 34. Upper and lower housing sections 48 and 50 mate to define the noted border fences such that flow from inlet 28 to outlet 30 is only through flat panel filter element 34 within inner fence 176. Outer border fence 174 defines intake plenum 36 at inlet 28 adjacent left end 38 of flat panel filter element 34. Oil and air flows upwardly through inlet 28 into intake plenum 36 and around left end 38 of flat panel filter element 34 to upper face 40 thereof. Outer border face 174 defines exit plenum 46 at outlet 30 adjacent right end 44 of flat panel filter element 34 such that air flows from lower face 42 of flat panel filter element 34 into exit plenum 46 and through outlet 30. In a further embodiment, sealing may also be enhanced by tapering walls 182 and 184. In FIG. 7, wall 184 is tapered rightwardly as it extends downwardly from upper housing section 48. Wall 182 is tapered rightwardly as it extends upwardly from lower housing section 50. This enhances the seal against gasket 172 along such taper. This also provides a guided lead-in of element 34 into the receiving pocket formed by such walls.

Upper housing section 48 has a plurality of downwardly extending central stand-offs 190, FIG. 3, and perimeter stand-offs 192. Lower housing section 50 has a plurality of upwardly extending central stand-offs 194 and perimeter stand-offs 196. Upper face 40 of flat panel filter element 34 faces upper housing section 48 and is separated therefrom by stand-offs 190 and 192 to define an upper gap 198, FIG. 5, therebetween for flow of oil and air. Lower face 142 of flat panel filter element 34 faces and is separated from lower housing section 50 by stand-offs 194 and 196 to define a lower gap 200 therebetween for exiting air flow. Additional lower stand-offs 197 extend upwardly from lower surface 100 of lower housing section 50 to engage the underside of flat panel filter element 34. These latter stand-offs 197 cover bolts 82 and 84. Lower housing section 50 has a diverter wall 202, FIGS. 3–7, extending upwardly therefrom in exit plenum 46 adjacent right end 44 of flat panel filter element 34 to divert air from lower gap 200 upwardly into exit plenum 46 as shown at arrow 204, FIGS. 5 and 7, before passage to outlet 30.

Left wall 206, FIG. 3, of upper portion 184 of inner fence 176 has an inlet cut-out section 208 therein at left end 38 of flat panel filter element 34 for passage of oil and air therethrough from intake plenum 36 to upper gap 198. Right wall 210 of lower portion 182 of inner fence 176 has an outlet cut-out section 212 therein at right end 44 of flat panel filter element 34 for passage of air therethrough from lower gap 200 to exit plenum 46. Oil and air flow from intake plenum 36 through inlet cut-out section 208 of upper fence portion 184 of inner fence 176 as shown in FIGS. 5 and 6 at arrows 214 and 216. The flow of oil and air downwardly through filter element 34 is shown at arrow 218 in FIGS. 6 and 7. The flow of air from lower gap 200 through lower cut-out section 212 in lower portion 182 of inner fence 176 is shown at arrows 220 and 222 in FIGS. 5 and 6, and then at arrow 204 upwardly and over diverter wall 202 and into exit plenum 46.

Inlet opening 28 in lower surface 100 of lower housing section 50 is within outer border fence 174 but outside of inner border fence 176. Drain port openings 106 and 108 in lower surface 100 of lower housing section 50 are each within inner border fence 176. Inner border fence 176 circumscribes flat panel filter element 34 and upper and lower gaps 198 and 200. Outer border fence 174 circumscribes inner border fence 176 and defines intake plenum 36 between inner and outer border fences 176 and 174, and defines exit plenum 46 between inner and outer border fences 176 and 174. Outlet 30 is provided through wall 177 of outer border fence 174 at exit plenum 46. Bypass port 142 is provided through outer border fence 174 at the intake plenum.

FIG. 20 shows a crankcase ventilation filter 300 mounted to valve cover 302 of diesel engine 304. The diesel engine crankcase ventilation filter includes a flat low profile filter housing 306 extending in a horizontal plane and having an upper planar horizontal surface 308, FIGS. 21, 23, a lower planar horizontal surface 310, and side surfaces 312 extending between the upper and lower surfaces. A planar horizontal flat panel filter element 314, FIG. 21, extends parallel to upper and lower surfaces 308 and 310. The housing has an upper plenum 316 between flat panel filter element 314 and upper surface 308, and a lower plenum 318 between flat panel filter element 314 and lower surface 310. The housing has an inlet 320, FIG. 20, receiving blow-by gas including oil and air from the diesel engine and supplying same along an inlet path beginning at 322, to be further described, to upper plenum 316 to flow downwardly through flat panel filter element 314 to lower plenum 318. The housing has a first outlet 324 outputting air along a first outlet path 326 from lower plenum 318, and a second outlet 328 outputting oil along a second outlet path 330 from lower plenum 318. Flat panel filter element 314 includes multi-layer media 332, including coalescing media, to be described.

Housing 306 is mounted on top of diesel engine 304, with flat panel filter element 314 immediately above valve cover 302. The housing includes an upper section 334, FIG. 21, providing the noted upper surface 308, and a lower section 336 providing the noted lower surface 310. Lower section 336 is provided by valve cover 302 having upstanding side surfaces 312, 338, and end surfaces 340, 342, 344. Upper section 334 has outer side surfaces 346, 348, overlapping side surfaces 312, 338, respectively. Inlet 320 extends through side surface 348 and then through end surface 344. Outlet 324 extends through side surfaces 312 and 346. Outlet 328 extends through side surfaces 338 and 348. Outlets 324 and 328 are preferably through distally opposite side surfaces such as 312 and 338. Oil fill tube 360 extends vertically upwardly from the diesel engine through the housing adjacent flat panel filter element 314 and provides an oil fill inlet for adding oil to the diesel engine. Oil fill tube 350 extends upwardly from valve cover 302 through upper housing section 334 at opening 352. Valve cover 302 is mounted to engine 304 in standard manner such as by bolts 354. Upper housing section 334 is mounted to lower housing section 336 provided by valve cover 302 by bolts such as 356.

The plane of flat panel filter element 314 and the planes of the directions of flow 322, 326, 330 through each of the inlet 320 and outlets 324 and 328, respectively, are all parallel to each other. Lower surface 310 has a ramp 358, FIG. 36, tapered downwardly from lower plenum 318 and providing outlet path 330. Outlet 328 is at the bottom of ramp 358. Outlet 324 is above outlet 328.

Flat panel filter element 314 has upper and lower oppositely facing planar faces 360, 362, FIGS. 31, 36, spanning along the horizontal plane of flat panel filter element 314 between first and second distally opposite ends 364 and 366, FIG. 21, and first and second distally opposite sides 368 and 370. Upper face 360 faces upwardly into upper plenum 316 and communicates with inlet 320, to be described, at first end 364 of flat panel filter element 314. Lower face 362 faces downwardly into lower plenum 318 and communicates with outlet 324 at first side 368 of flat panel filter element 314 and communicates with second outlet 328 at second side 370 of flat panel filter element 314.

Housing 306 includes a pre-chamber 372, FIGS. 21, 23, 31, at first end 364 of flat panel filter element 314. An inertial separator 374 is provided in pre-chamber 372, which inertial separator is preferably a vertically extending rough porous member such as shown in allowed U.S. application Ser. No. 09/356,072, filed Jul. 16, 1999, incorporated herein by reference. Pre-chamber 372 is horizontally adjacent upper and lower plenums 316 and 318, and communicates with upper plenum 316 through a transfer passage 376, FIG. 31, above first end 364, FIG. 21, of flat panel filter element 314. The transfer passage is provided by one or more apertures 376, 378, 380, 382, FIGS. 31–35, through a wall 384 extending downwardly from upper housing section cover 334. Inertial separator 374 is on another depending wall 386 extending downwardly from upper housing section cover 334. Wall 386 extends downwardly beyond wall 384, FIGS. 31, 32, to lie in the path 388, FIG. 12, of incoming oil and air along the noted inlet flow path. Inertial impactor 374 separates some of the oil as shown as drainage arrow 390, FIG. 31, and the remaining oil and air flow upwardly and laterally around wall 386 as shown at arrow 392 and upwardly as shown at arrow 393 and then through the noted transfer passage provided by apertures 376, 378, 380, 382 into upper plenum 316 for downward passage through the media of flat panel filter element 314 as shown at flow arrow 394.

Housing 306 has a third outlet 396, FIGS. 20, 21, 24, 33, outputting oil as shown at flow path arrow 398 from pre-chamber 372. This is the oil drained at 390, FIG. 31, from inertial separator 374. Third outlet 396 is through side surfaces 338 and 348. Lower housing section 336 provided by valve cover 302 has an upstanding wall provided by end surface 340, FIGS. 21, 31, separating lower plenum 318 and pre-chamber 372. Upstanding wall 340 has an upper end 400 spaced below upper surface 308, FIG. 31, by a gap 402 providing the noted transfer passage therethrough in combination with the noted transfer passage apertures 376, 378, 380, 382 in wall 384, to thus provide a transfer passage from pre-chamber 372 to upper plenum 316.

The inlet path for oil and air from the diesel engine has a first horizontal portion 388, FIG. 31, directing flow horizontally against inertial separator 374, a vertical portion 393 directing flow upwardly in pre-chamber 372, and a second horizontal portion 404 directing flow horizontally through the noted transfer passage at 376, 378, 380, 382, 402. Upper housing section 334 has the noted wall 386 extending downwardly into prechamber 372 and having a first vertical side 406 facing toward upstanding wall 340 and having a second oppositely facing vertical side 408. Inertial separator 374 is on vertical side 408 of downwardly extending wall 386 of upper section 334 of housing 306.

A crankcase depression regulation, CDR, valve 410, FIGS. 21, 23, 24, 26–30, is provided in series in the noted inlet path for restricting the flow of oil and air when engine vacuum reaches a given level. CDR valve 410 has an actuator vertically moveable within the housing, FIGS. 28, 29. The actuator is provided by a diaphragm 412 biased upwardly in FIGS. 27–30 by spring 414 and moveable vertically downwardly against a valve seat 416 to close the valve. The diaphragm is mounted at its outer circumference between upper and lower housing sections 418 and 420. The CDR valve at lower housing section 420 has the noted inlet 320 and has an outlet 422, both of which are on the same side of diaphragm 412, namely the lower side. When engine vacuum is not great enough to overcome the bias of spring 414, diaphragm 412 remains in a raised position as shown in FIG. 28, and incoming oil and air flow through the CDR valve as shown at 424 in FIG. 28 and then flows to valve outlet 422. When engine vacuum reaches a given level, the vacuum is sufficient to overcome the upward bias of spring 414, and the vacuum pulls diaphragm 412 downwardly as shown at arrows 426, FIG. 29, such that the diaphragm engages valve seat 416 and closes the valve, thus blocking flow of oil and air to outlet 422. If engine vacuum then decreases below the noted given level, spring 414 again moves diaphragm 412 upwardly, opening the valve, thus enabling flow of oil and air to the valve outlet as shown as arrows 388, FIGS. 30, 31.

Pre-chamber 372 is downstream of CDR valve 410, FIGS. 23, 31. Outlet 422 of CDR valve 410 directs flow horizontally as shown at 388, FIG. 31, against vertically extending inertial separator 374. CDR valve 410 at its outlet 422 has an accelerator nozzle 428 accelerating flow along a horizontal acceleration path 388 against inertial separator 374. Housing outlet 396, FIGS. 21, 31, 33, is below at least a portion of acceleration path 388. Transfer passage 376, 378, 380, 382, FIGS. 31, 33, is above acceleration path 388.

The flow path through housing 306 includes a first portion flowing horizontally from inlet 320 through CDR valve 410 as shown at arrows 322, 388. The flow path has a second portion flowing vertically upwardly in pre-chamber 372 along vertically extending dividing walls 340, 386, as shown at arrows 393, FIG. 33. The flow path has a third portion flowing horizontally through gap 376, 378, 380, 382, 402, as shown at arrow 404, FIG. 31. The flow path has a fourth portion as shown at 394, FIG. 31, flowing vertically downwardly along dividing wall 340 on the opposite side thereof from the noted second flow path portion in pre-chamber 372. The noted fourth flow path portion at 394 flows from upper plenum 316 through flat panel filter element 314 to lower plenum 318. The flow path includes a fifth portion flowing horizontally to outlet 324 as shown at flow arrow 326, FIGS. 20, 24, 36. The flow path has a sixth portion as shown at arrows 329, 330, FIGS. 36, 24, 22, 21, 20, flowing horizotally and downwardly from lower plenum 318 to outlet 328. The noted fifth and sixth flow path portions diverge in opposite directions.

Oil and air from inlet 320 flows through CDR valve 410 into pre-chamber 372 and then around first end 364, FIG. 21, of flat panel filter element 314 to the upper face 360 thereof, FIG. 31. Oil and air flows around end 364 along a flow path having both vertical and horizontal components. The path includes two vertical components in opposite directions, namely a first upward vertical component 393, and a second downward vertical component 394. The second vertical component 394 is downstream of the first vertical component 393 and extends from upper plenum 316 through flat panel filter element 314 to lower plenum 318. Horizontal component 404 is serially between vertical components 393 and 394, and lies above the noted first end 364 of flat panel filter element 314. The span from first end 364 to second end 366 of flat panel filter element 314 is parallel to and in the same direction as flow along horizontal component 404.

Upper and lower housing sections 334 and 336 mate to define an border fence 430, 432, FIG. 36, around a perimeter around flat panel filter element 314 in sealing relation at gasket 434 such that flow from inlet 320 to outlets 324, 328 is through flat panel filter element 314 within the fence. Upper housing section 334 has a plurality of downwardly extending stand-offs 436, FIG. 23. Upper face 360 of flat panel filter element 314 faces upper housing section 334 and is separated therefrom by stand-offs 436 of upper housing 334 to define an upper gap therebetween providing plenum 316 for flow of oil and air. Lower housing section 336 has a plurality of upwardly extending stand-offs 438, FIG. 21. Lower face 362 of flat panel filter element 314 faces and is separated from lower housing section 336 by stand-offs 438 of lower housing section 336 to define a lower gap therebetween providing plenum 318 for exiting air flow and exiting oil flow.

The present structure enables a flat low profile horizontal orientation enabling mounting on top of the engine such as the valve cover, even within the limited space requirements of today's diesel engine compartments. In preferred form, the vertical height of flat panel filter element 314, FIG. 31, is at least as great as the vertical height of at least one of the upper and lower plenums 316 and 318. In preferred form, the vertical height of flat panel filter element 314 is preferably greater than the vertical height of one of the plenums and at least 75% of the vertical height of the other plenum. Further in preferred form, the vertical height of flat panel filter element 314 is at least 50% of the sum of the vertical heights of upper and lower plenums 316 and 318.

Flat panel filter element 314 has an extended auxiliary perimeter section 450, FIGS. 21, 37, having third and fourth sides 452 and 454 extending from the noted first end 364 oppositely from the noted first and second sides 368 and 370. Third and fourth sides 452 and 454 extend to a third end 456 spaced from first end 364 by a gap 458 therebetween. Pre-chamber 372, FIG. 31, communicates with upper plenum 316 through gap 458 between ends 364 and 456. Upper and lower housing sections 334 and 336 mate to define the noted first border fence 430, 432, FIG. 36, around a first perimeter 460, FIG. 37, of flat panel filter element 314 along first end 364, first side 368, second end 366, and second side 370. Upper and lower housing sections 334 and 336 mate to define a second border fence 462, 464, FIG. 33, around a second perimeter 466, FIG. 37, of flat panel filter element 314 along first end 364, third side 452, third end 456, and fourth side 454. The total combined perimeter of first and second perimeter sections 460 and 466 is designated at 468 and extends along third end 456, third side 452, first side 368, second end 366, second side 370, and fourth side 454.

Flat panel filter element 314 includes the noted media 322, including coalescing media, spanning a horizontal supporting and sealing perimeter border frame 470, FIGS. 40, 41, which frame extends along the noted first perimeter 460. Flat panel filter element 314 includes multiple layers, FIG. 43, including an upper region 472 of one or more layers, a middle region 474 of one or more layers, and a lower region 476 of one or more layers, and upper and lower protective layers 478 and 480 such as screen or mesh. Upper region 472 provides pre-filtering and is selected to have medium efficiency media relative to the middle and lower regions. Middle region 474 provides removal of oil mists and is selected to be finer, higher efficiency media than upper region 472. Lower region 476 provides coalescing and draining of oil therefrom and is selected to have coarser, lower efficiency media than upper region 472. Media 322 has a central spanning pillow portion 482, FIGS. 40, 41, and an outer peripheral flattened portion 484 compressed to a substantially smaller vertical height than central spanning pillow portion 482. Flat panel filter element 314 has the noted multiple layers, FIG. 7, including in central spanning pillow portion 482 and outer peripheral flattened portion 484. The layers at outer peripheral flattened portion 484 are preferably heat sealed to each other, FIGS. 42, 44, and heat sealed to perimeter border frame 70 at notch 486 therein. A plastic border frame 470 is preferred, to enable such heat sealing.

A gasket 488, FIGS. 40–42, is secured to perimeter border frame 470 for creating a seal with housing 306 at the noted border fences. In preferred form, the gasket is integrally molded to frame 470 around first perimeter 460. The gasket has a first sealing surface 490, FIG. 42, providing axial sealing along a vertical axial direction perpendicular to the noted horizontal plane of flat panel filter element 314. The gasket has a second sealing surface 492 providing lateral sealing along a lateral direction parallel to the noted horizontal plane. First sealing surface 490 is sealed by axial compression, for example as shown as compressed between border fences 430, 432, FIG. 36, and 462, 464, FIG. 33. Second sealing surface 492 is sealed by lateral deflection, for example as shown at 494, 496, FIG. 36, and 498, 500, 502, 504, FIG. 33. Second sealing surface 492 is provided by a cantilever arm 506, FIG. 42, laterally outward of perimeter border frame 470 on the opposite side thereof from media 322 and deflectable laterally inwardly, rightwardly in FIG. 42, toward perimeter border frame 470.

In preferred form, the gasket is provided with first and second cantilever arms 506 and 508 in inverted V-shaped relation laterally outward of perimeter frame 470 on the opposite thereof from media 322. First cantilever arm 506 is laterally outward of second cantilever arm 508 and is deflectable laterally inwardly, rightwardly in FIG. 42, toward second cantilever arm 508. The noted second sealing surface 492 is provided by first cantilever arm 506.

Gasket 488 has a first portion 510, FIG. 42, mounted to perimeter border frame 470, a second portion 512 extending laterally horizontally from first portion 510 beyond perimeter border frame 470, and a third portion 514 laterally spaced from perimeter border frame 470. The noted first sealing surface 490 is provided by at least one and preferably both of gasket portions 510 and 512. Perimeter border frame 470 has a recessed pocket 516 facing vertically upwardly and receiving first gasket portion 510 therein and mounting the gasket to the perimeter border frame.

As noted above, flat panel filter element 314 has upper and lower oppositely facing planar faces 360 and 362 spanning along the horizontal plane of flat panel filter element 314 between first and second distally opposite ends 364 and 366 and first and second distally opposite sides 368 and 370. First and second ends 364 and 366 and first and second sides 368 and 370 define the noted first or primary perimeter section 460. Flat panel filter element 314 includes the noted extended second or auxiliary perimeter section 466 provided by the noted third and fourth sides 452 and 454 extending from first end 364 oppositely from first and second sides 368 and 370, which third and fourth sides 452 and 454 extend to the noted third end 456 spaced from first end 364 by the noted gap 458 therebetween. Perimeter border frame 470 extends only along primary perimeter section 460, and not along auxiliary perimeter section 466. Gasket 488 extends along both of the primary and auxiliary perimeter sections 460 and 466. Primary perimeter section 460 has an inner periphery 520 and an outer periphery 522. Auxiliary perimeter section 466 has an inner periphery 524 and an outer periphery 526. Inner periphery 520 of primary perimeter section 460 supports and seals media 322 at flattened section 488. Gasket 488 extends along outer periphery 522 of primary perimeter section 460 and along both of the inner and outer peripheries 524 and 526 of auxiliary perimeter section 466. Gap 458 is open and unspanned by media 322. In an alternate embodiment, gasket 488 is adhesively mounted to perimeter border frame 470, FIG. 44.

It is recognized that various equivalents, alternatives and modifications are possible within the scope of the appended claims.

What is claimed is:

1. A flat panel filter element for a diesel engine crankcase ventilation filter having a flat low profile filter housing extending in a horizontal plane, said flat panel filter element comprising media, including coalescing media, spanning a horizontal supporting and sealing perimeter border frame passing flow downwardly therethrough, wherein said flat panel filter element comprises multiple layers including an upper region, a middle region, and a lower region, said upper region providing pre-filtering and comprising medium efficiency media relative to said middle and lower regions, said middle region providing removal of oil mists and comprising finer, higher efficiency media than said upper region, said lower region providing coalescing and draining of oil therefrom and comprising coarser, lower efficiency media than said upper region.

2. A flat panel filter element for a diesel engine crankcase ventilation filter having a flat low profile filter housing extending in a horizontal plane, said flat panel filter element comprising media, including coalescing media, spanning a horizontal supporting and sealing perimeter border frame passing flow downwardly therethrough, wherein said media comprises a central spanning pillow portion and an outer peripheral flattened portion compressed to a substantially smaller vertical height than said central spanning pillow portion.

3. The invention according to claim 2 wherein said flat panel filter element comprises multiple layers, including in said central spanning pillow portion and said outer peripheral flattened portion, and wherein said layers at said outer peripheral flattened portion are heat sealed to each other.

4. The invention according to claim 2 wherein said flat panel filter element comprises multiple layers, including in said central spanning pillow portion and said outer peripheral flattened portion, and wherein said layers at said outer peripheral flattened portion are heat sealed to said perimeter border frame.

5. The invention according to claim 2 wherein said perimeter border frame is plastic, said flat panel filter element comprises multiple layers, including in said central spanning pillow portion and said outer peripheral flattened portion, and said layers at said outer peripheral flattened portion are heat sealed to each other and to said perimeter border frame.

6. A flat panel filter element for a diesel engine crankcase ventilation filter having a flat low profile filter housing extending in a horizontal plane, said flat panel filter element comprising media, including coalescing media, spanning a horizontal supporting and sealing perimeter border frame passing flow downwardly therethrough, and comprising a gasket secured to said perimeter border frame for creating a seal with said housing.

7. The invention according to claim 6 wherein said gasket is molded to said perimeter border frame.

8. The invention according to claim 6 wherein said gasket comprises a first sealing surface providing axial sealing along an axial direction perpendicular to said horizontal plane, and a second sealing surface providing lateral sealing along a lateral direction parallel to said horizontal plane.

9. The invention according to claim 8 wherein said first sealing surface is sealed by axial compression, and said second sealing surface is sealed by lateral deflection.

10. The invention according to claim 9 wherein said second sealing surface comprises a cantilever arm laterally outward of said perimeter border frame on the opposite side thereof from said media and deflectable laterally inwardly toward said perimeter border frame.

11. The invention according to claim 9 wherein said gasket comprises first and second cantilever arms in inverted V-shaped relation laterally outward of said perimeter border frame on the opposite side thereof from said media, said first cantilever arm being laterally outward of said second cantilever arm and deflectable laterally inwardly toward said second cantilever arm, said second sealing surface being provided by said first cantilever arm.

12. The invention n according to claim 9 wherein said gasket has a first portion mounted to said perimeter border frame, a second portion extending laterally horizontally from said first portion beyond said perimeter border frame, and a third portion laterally spaced from said perimeter border frame, wherein at least one of said first and second portions of said gasket provides said first sealing surface, and said third portion of said gasket provides said second sealing surface.

13. The invention according to claim 12 wherein said first portion of said gasket provides said first sealing surface.

14. The invention according to claim 12 wherein said second portion of said gasket provides said first sealing surface.

15. The invention according to claim 12 wherein both of said first and second portions of said gasket provide said first sealing surface.

16. The invention according to claim 12 wherein said perimeter border frame has a recessed pocket facing vertically and receiving said first portion of said gasket therein and mounting said gasket to said perimeter border frame.

17. A flat panel filter element for a diesel engine crankcase ventilation filter having a flat low profile filter housing extending in a horizontal plane, said flat panel filter element comprising media, including coalescing media, spanning a horizontal supporting and sealing perimeter border frame passing flow downwardly therethrough, wherein said flat panel filter element has upper and lower oppositely facing planar faces spanning along the horizontal plane of said flat panel filter element between first and second distally opposite ends and first and second distally opposite sides, said first and second ends and said first and second sides defining a primary perimeter section, and wherein said flat panel filter element comprises an extended auxiliary perimeter section comprising and third and fourth sides extending from said first end to a third end spaced from said first end by a gap therebetween.

18. The invention according to claim 17 wherein said perimeter border frame extends along said primary perimeter section.

19. The invention according to claim 18 wherein said perimeter border frame extends only along said primary perimeter section, and not along said auxiliary perimeter section.

20. The invention according to claim 18 comprising a gasket extending along both of said primary and auxiliary perimeter sections.

21. The invention according to claim 20 wherein each of said primary and auxiliary perimeter sections has an inner and an outer periphery, said inner periphery of said primary perimeter section supports and seals said media, and said gasket extends along said outer periphery of said primary perimeter section and along both of said inner and outer peripheries of said auxiliary perimeter section.

22. The invention according to claim 17 wherein said gap is open and unspanned by said media.

23. A method for filtering blow-by gas, including oil mist and air, from a diesel engine crankcase comprising providing a flat panel filter element for a diesel engine crankcase ventilation filter having a low profile filter housing extending in a horizontal plane, providing said flat panel filter element comprising media, including coalescing media, spanning a horizontal supporting and sealing perimeter border frame, and passing flow downwardly through said flat panel filter element.

24. The method according to claim 23 comprising providing said flat panel filter element with multiple layers including an upper region, a middle region, and a lower region, and comprising pre-filtering said flow in said upper region with medium efficiency media relative to said middle and lower regions, removing oil mists in said middle region with finer, higher efficiency media than said upper region, and coalescing and draining oil from said lower region with coarser, lower efficiency media than said upper region.

25. The method according to claim 23 comprising providing said media with a central spanning pillow portion and an outer peripheral portion, and compressing said outer peripheral portion to a flattened portion of substantially smaller vertical height than said central spanning pillow portion.

26. The method according to claim 25 comprising providing multiple layers in said flat panel filter element, including in said central spanning pillow portion and said outer peripheral flattened portion, and heat sealing said layers at said outer peripheral flattened portion to each other.

27. The method according to claim 25 comprising providing multiple layers in said flat panel filter element, including in said central spanning pillow portion and said outer peripheral flattened portion, and heat sealing said layers at said outer peripheral flattened portion to said perimeter border frame.

28. The method according to claim 25 comprising providing a plastic said perimeter border frame, providing multiple layers in said flat panel filter element, including in said central spanning pillow portion and said outer peripheral flattened portion, and heat sealing said layers at said outer peripheral flattened portion to each other and to said perimeter border frame.

29. The method according to claim 23 comprising securing a gasket to said perimeter border frame for creating a seal with said housing.

30. The method according to claim 29 comprising molding said gasket to said perimeter border frame.

31. The method according to claim 29 comprising axially sealing said gasket along a first sealing surface to said housing in an axial direction perpendicular to said horizontal plane, and laterally sealing said gasket along a second sealing surface to said housing along a lateral direction parallel to said horizontal plane.

32. The method according to claim 31 comprising axially compressing said gasket at said first surface, and laterally deflecting said gasket at said second surface.

33. A method for making a flat panel filter element for a diesel engine crankcase ventilation filter having a flat low profile filter housing extending in a horizontal plane, said flat panel filter element comprising media, including coalescing media, spanning a horizontal supporting and sealing perimeter border frame passing flow downwardly therethrough, comprising forming said flat panel filter element having upper and lower oppositely facing planar faces spanning along the horizontal plane of said flat panel filter element between first and second distally opposite ends and first and second distally opposite sides, said first and second ends and first and second sides defining a primary perimeter section, and forming said flat panel filter element with an extended auxiliary perimeter section comprising third and fourth sides extending from said first end to a third end spaced from said first end by a gap therebetween.

34. The method according to claim 33 comprising providing said perimeter border frame along said primary perimeter section.

35. The method according to claim 34 comprising providing said perimeter border frame only along said primary perimeter section, and not along said auxiliary perimeter section.

36. The method according to claim 34 comprising securing a gasket to said perimeter border frame for creating a seal with said housing, and extending said gasket along both of said primary and auxiliary perimeter sections.

37. The method according to claim 36 wherein each of said primary and auxiliary perimeter sections has an inner and an outer periphery, and comprising supporting and sealing said media along said inner periphery of said primary perimeter section, and extending said gasket along said outer periphery of said primary perimeter section and along both of said inner and outer peripheries of said auxiliary perimeter section.

38. The method according to claim 33 comprising leaving said gap open and unspanned by said media.

* * * * *